US007802184B1

(12) United States Patent  
Battilana

(10) Patent No.: US 7,802,184 B1  
(45) Date of Patent: Sep. 21, 2010

(54) METHOD AND APPARATUS FOR PROCESSING TEXT AND CHARACTER DATA

(75) Inventor: Michael C. Battilana, Freilassing (DE)

(73) Assignee: CLOANTO Corporation, Las Vegas, NV (US)

( * ) Notice: Subject to any disclaimer, the term of this patent is extended or adjusted under 35 U.S.C. 154(b) by 769 days.

(21) Appl. No.: 11/131,915

(22) Filed: May 18, 2005

Related U.S. Application Data

(63) Continuation of application No. 09/675,441, filed on Sep. 28, 2000, now abandoned.

(60) Provisional application No. 60/156,377, filed on Sep. 28, 1999.

(51) Int. Cl.
 *G06N 3/00* (2006.01)
(52) U.S. Cl. .................... 715/257; 715/256
(58) Field of Classification Search .............. 715/234, 715/244, 254, 257, 256
 See application file for complete search history.

(56) References Cited

U.S. PATENT DOCUMENTS

| | | | | |
|---|---|---|---|---|
| 5,761,689 | A * | 6/1998 | Rayson et al. | 715/210 |
| 6,047,300 | A * | 4/2000 | Walfish et al. | 715/257 |
| 6,424,983 | B1 * | 7/2002 | Schabes et al. | 715/257 |
| 6,631,501 | B1 * | 10/2003 | Jurion et al. | 715/257 |

FOREIGN PATENT DOCUMENTS

| EP | 0588538 | * | 3/1994 |
|---|---|---|---|
| GB | 2325073 | * | 11/1998 |

OTHER PUBLICATIONS

Yarowsky, David, "Decision Lists for Lexical Ambiguity Resolution: Application to Accent Restoration in Spanish and French," 1994, pp. 1-8.*

* cited by examiner

*Primary Examiner*—Kyle R Stork  
(74) *Attorney, Agent, or Firm*—Suiter Swantz pc llo

(57) ABSTRACT

An apparatus and method for processing text or character data are disclosed. A text processing system receives a character input string and determines whether to apply character processing. A non-English language such as Italian can be entered into a processing system such as a computer using a standard English based keyboard such that additional keys for providing accents or other grammatical and punctuation symbols or characters not existing in English are not required. In one mode, text is automatically accented or punctuated without requiring user intervention. In another mode, a user is provided with a list of accent or punctuation choices so that the user may select the optimum accent or punctuation. Text processing of an input may be activated by a text sequence including a possible vowel accent or apostrophe error, and may continue as an input method editor loop in response to repeated actuations of the key associated with the first activation event. When an activator event input is detected, a rules based system is utilized to select a correctly accented and punctuated character. A list of alternative accents and punctuations is optionally displayed, and a user may toggle through the list using the activator event to select a desired character. The display provides information for a level of certainty of a selected character or word.

28 Claims, 6 Drawing Sheets

METHOD AND APPARATUS FOR PROCESSING TEXT AND CHARACTER DATA

CROSS-REFERENCE TO RELATED DOCUMENTS

The present application is a continuation under 35 U.S.C. §120 of U.S. patent application Ser. No. 09/675,441, filed on Sep. 28, 2000 now abandoned, which in-turn claims priority under 35 USC §119(e) to provisional U.S. Application No. 60/156,377 filed Sep. 28, 1999. Said U.S. patent application Ser. No. 09/675,449 and U.S. Provisional Patent Application 60/156,377 are herein incorporated by reference in their entirety.

FIELD OF THE INVENTION

The present invention generally relates to the field of information processing, and particularly to a character processing system.

BACKGROUND OF THE INVENTION

The advent of computer technology has revolutionized the way in which people around the world communicate. One area in which computer technology has provided change is in word and text processing applications. The first typewriters and computer terminals, which still set standards for text keyboard layouts, such as the "QWERTY" and "Dvorak" configurations, and for computer text encoding including the American Standard Code for Information Interchange (ASCII) and the Extended Binary Coded Decimal Interchange Code (EBCDIC), were invented and widely used in the United States, which continues to be the primary market for the introduction of such devices, and in which English is the official language. English is also both the most popular second language, as well as the second most popular mother language in the world. Written English uses the Roman alphabet with no diacritical marks (26 characters in upper and lower case: A, B, C, D, E, F, G, H, I, J, K, L, M, N, O, P, Q, R, S, T, U, V, W, X, Y and Z). Most other languages that use the Roman alphabet use an extended version of such alphabet, where diacritical marks such as accents and umlauts, for example À, Á, Â or Ä, are combined with certain alphabetical characters that are also used in English such as A. The characters that are present on keyboards designed for the English language are also present in most keyboards designed for other languages, whereas the additional non-English characters vary widely from keyboard design to keyboard design, depending on the target languages (e.g., German, French, Italian, etc.). In a similarly limiting way, the first definitions of computer character sets, which specify how each character is to be stored in computer memory, did not assign codes to letters other than the 26 upper case and 26 lower case letters used in English. The most important of these first character sets, which are still in use today, are ASCII, where 7 bits out of 8 are used to store information, and EBCDIC, which uses 8 bits of data, and is based on IBM's earlier BCD encoding. In the ASCII set, the upper range of 128 codes having the $8^{th}$ bit set was left undefined and unused. Similarly, in EBCDIC, certain blocks of codes were left unused. Over the years, both character sets have been extended in order to store certain non-English letters, either by replacing certain non-alphabetical characters with non-English alphabetical ones, or by assigning some codes, which had originally been left undefined. As newer character sets were defined, these in general maintained backward compatibility with either ASCII or EBCDIC. Even newer 16-bit and 32-bit global character encoding schemes (e.g., Unicode) retain, for compatibility, the original subset of 7-bit ASCII codes. This illustrates how, both for the layout of text input keyboards, as well as for character encoding definitions, there is a subset of characters which is in large part both privileged and standard. This subset includes the 26 letters from A to Z, in upper and in lower case (a total of 52 alphabetical letters), the 10 digits, as well as certain spacing and punctuation signs, and other signs such as the apostrophe (ASCII decimal code 39), and the "grave" character (ASCII decimal code 96), which is very similar to the apostrophe. Neither the original ASCII nor the original EBCDIC character encoding set provide support for letters used in non-English languages such as Italian. This means that on systems that employ these character sets there is no accepted standard for encoding, for example all the accented letters used in Italian. Thus there lies a need for a text processing system that allows the accents and punctuation of a non-English language to be processed by an English based system using standard English based input devices such as a QWERTY keyboard.

SUMMARY OF THE INVENTION

The present invention is directed to an apparatus for processing character or text input. In one embodiment, the apparatus includes means for receiving an input, means for determining whether to execute character processing on the input, means for executing character processing on the input whereby an output is produced representative of the character processed input, and means for providing the output to an output system.

The present invention is further directed to a method for processing character or text input. In one embodiment the method includes steps for receiving an input, determining whether to process the input according to a predetermined character processing rule, in the event it is determined to process the input, processing the input according to a predetermined character processing rule whereby and output representative of the processed input is produced, and providing the output to an output system.

The present invention is directed in one embodiment to a character encoding and decoding method that allows accented letters to be stored using a standard unmodified character set, such as 7-bit ASCII. The encoding method of the present invention can be applied to a stream of data originating either from a file or from keyboard input events, as well as from other sources. The basic encoding method can be extended to detect and correct different types of errors in the input text, as well as to give total control to the user, to handle, for example, exceptions as well as deliberate errors.

A text encoding method whereby certain combinations of characters in a stream of text input events are converted to other characters in the output stream, in consideration of the available input device, the input and output character sets, text context, language rules, character input timing information, and custom parameters. Several ways to interface with the host environment are considered. Custom parameters, both to configure the operation of the invention, as well as to update the language rules and the database of character sets, can be entered by means of a dedicated interface, or by entering appropriate data into the input stream.

The present invention provides a method and apparatus for encoding diacritical marks, apostrophes and other word-related signs, optionally correcting any errors that are found. The error management part of the invention provides automatic error correction of accents, apostrophes and other signs used by the encoding techniques described here according to proper grammatical rules. In one embodiment, the invention may be utilized with languages wherein hints and activator event sequences provided in the input stream, e.g., by the user, are, alone, not sufficient to define a character in an unambiguous and error-free way. Accent encoding limitations are common both to keyboards and to character set codes, and both can be treated as the source of a text input stream with the present invention. The present invention is also capable of being applied in one embodiment to overcome the limitations of both keyboard input data, and text file data, as well as other, similar text streams. In an embodiment wherein the invention is utilized in real time, the present invention eases typing of text in Italian and in languages with similar properties, making it possible to reduce the number of keys on a keyboard normally required for typing text in such languages, as well as allowing for a keyboard not specifically designed for such languages to be used, and virtually eliminating errors involving diacritical marks, while providing for simple handling of exceptions. For Italian, an embodiment of the invention specifies different types of logic that can be applied to resolve specific ambiguities and errors typical of Italian writing. This invention can also be very useful for German, Spanish, and other languages in which such logic is not necessary, for example, because hints and activator event sequences present in the text input stream are sufficient to unambiguously define a character, but, for reasons such as the lack of certain national characters in the keyboard or character set, a simpler way to input national characters than the methods currently in use is desirable. Additionally, the present invention provides for different ways to easily program and input characters that may not yet be encoded on a keyboard or character set, such as, for example, the symbol for the euro currency.

In one embodiment, the present invention provides a simpler set of rules that can be implemented in real time even on the slower systems. In alternative embodiment, a more complex set of rules may be implemented providing more options for more powerful and professional systems. The present invention, in one embodiment, provides for the encoding, decoding and editing of text in Italian and similar languages using standard 7 bit ASCII character codes, thereby reducing text complexity and storage requirements compared to encoding methods which employ 8 or more bits of information per character. The present method provides for the automatic correction and processing of text streams employing 7, 8 or more bits of significant character information by automatically recognizing factors such as the character encoding set and the language of the text, and appropriately applying the encoding method. The method is capable of normalizing text to a standard format so that it can more effectively be indexed or used for comparisons and searches in applications such as Internet search engines, or the search functions in word processing and database applications.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to one or more embodiments of the invention, examples of which is illustrated in the accompanying drawings.

Figure 1:
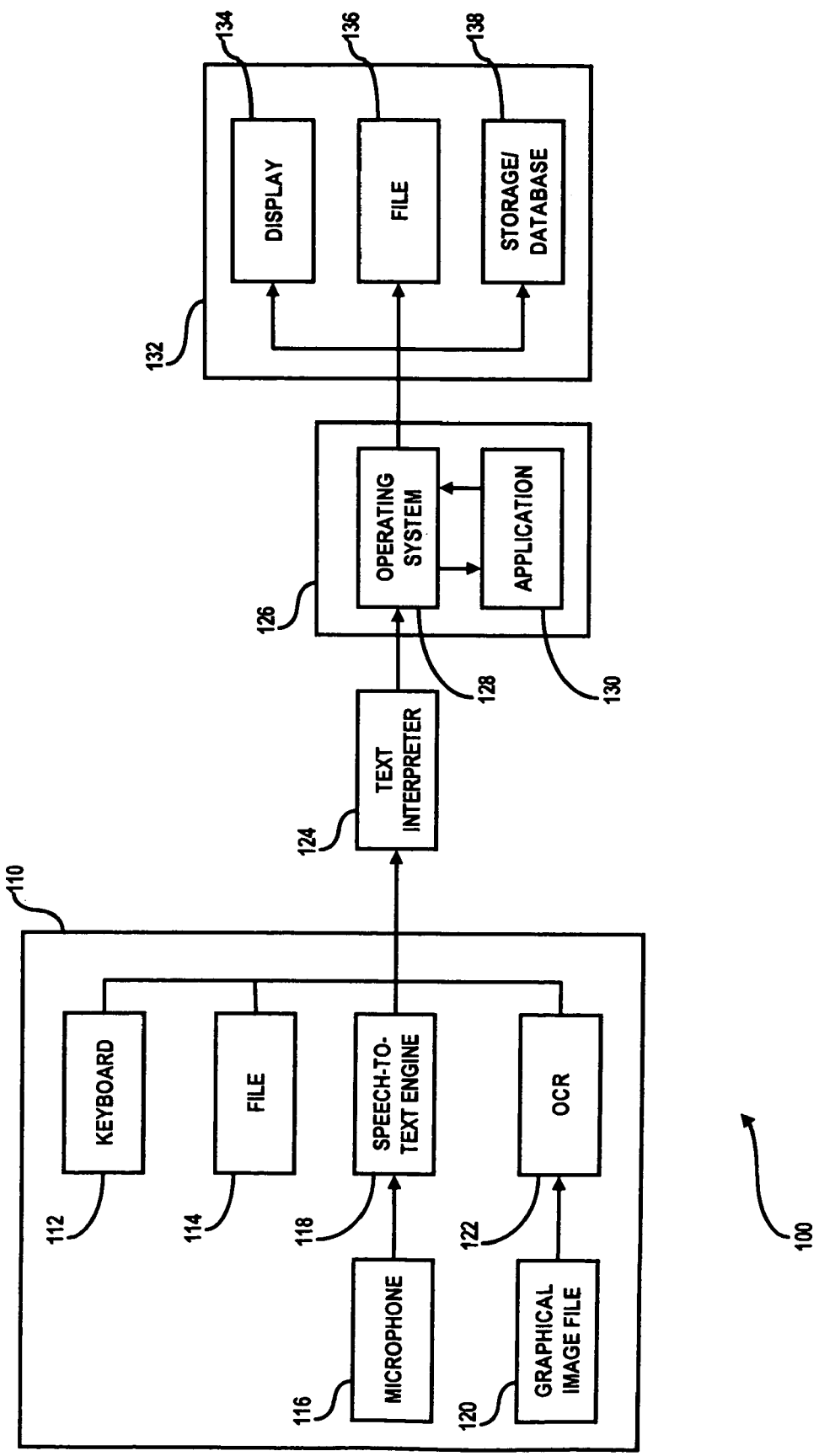
FIG. 1 is a block diagram of an overall system level embodiment of the present invention.

Referring now to FIG. 1, a block diagram of an overall system embodiment of the present invention will be discussed. System 100 includes a text input system 110 that includes at least one or more of several means by which text or character data may be provided as input to processing system 126. Text input system 110 may comprise, for example, a keyboard 112 with which a user is able to manually enter or type text or characters to provide a text or character input stream, or a file 114 in which text or characters are stored in a format that is capable of being read, interpreted and processed by processing system 126. Furthermore, input system 110 may include a microphone 116 coupled to a speech-to-text engine 118 such that words or utterances spoken by a user are processed into a text or character stream that is capable of being interpreted and processed by processing system 126. Additionally, input system 110 may include a graphical image file 120 generated by optically scanning a text document that is then processed by an optical character reader that is capable of producing text or characters that are capable of being interpreted and processed by processing system 126.

Processing system 126 may be any type of system that is capable of processing and editing text or character input. In one embodiment, for example, processing system 126 includes an operating system 130 for controlling an application 130 that is capable of processing and editing a text or character stream provided to processing system 126. For example, application 130 may be a standard word processor such as MICROSOFT WORD for running under operating system 128 that may be, for example, MICROSOFT WINDOWS 98, MICROSOFT WINDOWS NT, MICROSOFT WINDOWS ME, or MICROSOFT WINDOWS 2000, all of which being available from Microsoft Corporation of Redmond, Wash. As text or character data is processed by application 130, operating system 126 is capable of causing the resulting output of application 130 to be provided to output system 132. Output system 132 may include, for example, display 134 for displaying the output of application 130 in a format readable by a viewer, file 136 for storing the output of application 136 for later retrieval by operating system 126, or a storage database 138 wherein the output is stored in a format readable by other applications or by other computer systems.

In operation of the present invention, a text interpreter 124 receives an incoming text or character stream provided by input system 110 and processes the text or character stream in accordance with predetermined text processing rules. Text interpreter 124 may be tangibly embodied, for example, as a stand-alone hardware or firmware device connected between input system 110 and processing system 124. Alternatively, text interpreter 124 may be directly incorporated into one or more input devices 112-122 as hardware, firmware, software, or a combination thereof. In a further alternative embodiment, text interpreter 124 may be incorporated in processing system 126 as a hardware device, as firmware, as software or as a combination thereof. For example, text interpreter 124 may be included as a portion or subroutine of operating system 128 or application 130. Alternatively, text interpreter 124 may itself be a stand-alone application that is capable of providing an output directly to output system 132 or that is capable of being read and interpreted by application 130. In a further alternative embodiment, text interpreter 124 is capable of operating simultaneously and in conjunction with application 130. Thus, one having skill in the art would appreciate that the placement of text interpreter between text input system 110 and processing system 126 is for example purposes and need not be limited to the position illustrated in FIG. 1. As alternative embodiments, text interpreter 124 may be incorporated within text input system 110, for example being built into keyboard 112, or may be incorporated into processing system 126, for example as part of either operating system 128, application 130, or as a self contained hardware device, firmware, or routine or process running on processing system 126.

Figure 2:
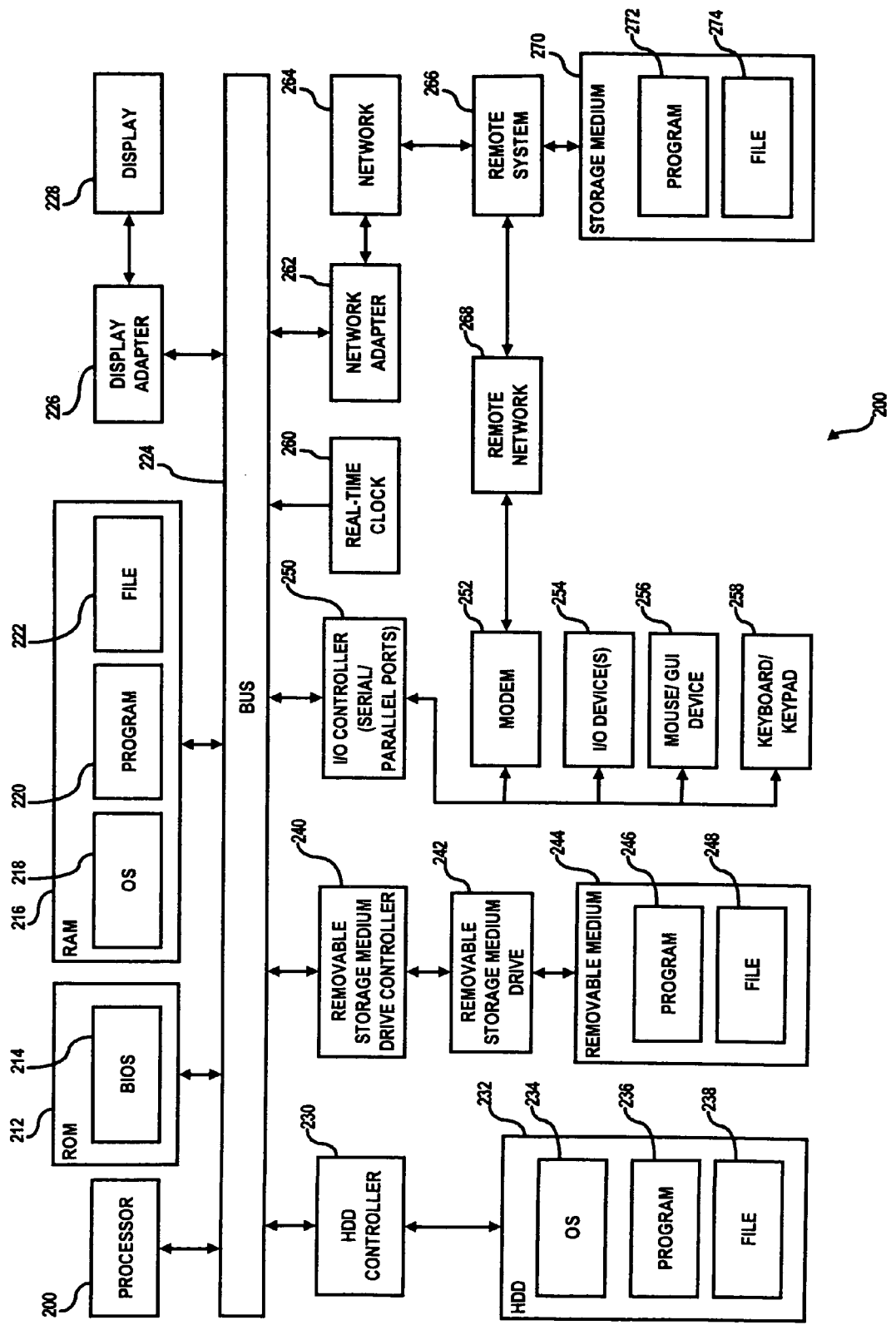
FIG. 2 is a block diagram of a computer system capable of tangibly embodying the present invention.

Referring now to FIG. 2, a block diagram of a computer system that is capable of tangibly embodying the present invention will be discussed. Computer system 200 is capable of implementing, at least in part or in whole, text processing system 100, or any portion thereof, as discussed with respect to FIG. 1. Computer system 200 includes a processor 200 for processing digital data. Processor 200 may comprise, for example, a complex instruction set computing (CISC) microprocessor, a reduced instruction set computing (RISC) microprocessor, a very long instruction word (VLIW) microprocessor, a digital signal processor (DSP), a combination of processors, or the like. A bus 224 couples to processor 210 for transmitting signals between processor 210 and other components, systems, or devices of computer system 200. A read-only memory (ROM) 212 is coupled to bus 224 for storing information that is intended not to be rewritten, or only rewritten infrequently. A random access memory (RAM) 216 couples to bus for storing information that can be dynamically written or read by processor 210. ROM 212 includes a basic input-output system (BIOS) routines for initializing computer system 200 and loading operating system (OS) 218 into RAM 216 at startup, and for facilitating the transfer of information among the devices of computer system 200. Operating system 218 may be loaded from a hard disk drive 232 coupled bus 224 via hard disk drive controller 230 in which case operating system 234 is the same as operating system 218. Likewise, RAM 220 may store one or more programs 220 and one or more files 222 that may be loaded from hard disk drive 232 in which case program 236 and file 238 are the same as program 220 and file 222, respectively. A display adapter 226 couples to bus 224 for displaying a video signal received via bus 224 on display 228. Computer system 200 may include one or more removable storage medium device controllers 240 for controlling one or more removable storage medium drives 242 that is capable of reading from or reading from and writing to a removable storage medium 224 on which a program 246 or a file 248 may be stored. For example, removable medium may include, but is not limited to, a compact disk read-only memory (CD-ROM) or a writable CD-ROM, a floppy disk, an optical disk, an optical-floppy disk, a digital versatile disk (DVD or DVD ROM) or a writable DVD, laser disk, magnetic tape (e.g., reel or cassette), removable hard disk drive, semiconductor memory (e.g., flash memory card or memory stick), or the like. An input/output (I/O) controller 250 is coupled to bus for connecting computer system 200 to one or more input, output, or input/output devices such as modem 252, I/O device 254, mouse or graphical user interface (GUI) device 256, keyboard/keypad 258 or the like. I/O controller 250 may provide one or more ports such as a serial port, parallel port, Universal Serial Bus (USB) port, or the like. I/O device 254 may include any one or more I/O device such as a touch screen input device laid over display 228 for operating as a GUI device in conjunction with a GUI based operating system. Real-time clock 260 provides one or more timing signals for synchronizing the operation of the devices of computer system 200. A network adapter 262 is capable of coupling computer system 200 to a remote system 266 via network 264 such as a local area network (LAN) or intranet. Likewise, modem 252 is capable of coupling computer system 200 to a remote system 266 via a remote network such as a wide area network 268 or a world-wide network such as the Internet. Remote system 266 may be coupled to a storage medium 270 on which a program 272 or file 274 is stored that may be transferred from remote system 266 via network 264 or remote network 268 to computer system 200 and stored, for example in RAM 216, hard disk drive 232 or removable medium 244. In one embodiment, computer system 200 and remote system 266 may implement a client-server arrangement in which the processing of an application may be divided between one of computer system 200 or remote system 266 and the other. Computer system 200 may be a client and remote system 266 may be a server, or vice-versa. Text interpreter 124 of FIG. 1 may be implemented with computer system 200 as a program of instructions executable by processor 210, or may be implemented as an I/O device 254 coupled in-line with another input device (e.g., keyboard/keypad 258) or operating in parallel therewith.

In one embodiment of the present invention, text system 100 is capable of processing an incoming text string according to the rules of the Italian language using a standard input device or system such as a standard, English based keyboard. Although the present invention is particularly directed to the Italian language for example and discussion purposes, one having skill in the art would appreciate that the teachings of the present invention may be applied to many other languages, including but not limited to French and German languages. It is not intended that the present invention be limited to Italian or any other specific language.

Functions of the Invention

In accordance with the present invention, system 100 is capable of processing a stream of file of text data. The data can for example be keyboard data as it is typed (connecting to the operating system as a keyboard hook, or through interfaces for input method editors, or through interfaces for assistive technologies, or physically connecting to the keyboard hardware, etc.), or data being read from an existing file, or data being accessed through a standard interface provided by programs like MICROSOFT WORD, or computer clipboard data (which the user has copied there, system 100 processes, and is then ready for being pasted back). A hook is defined in at least one embodiment of the invention as a location in a routine or program in which the programmer can connect or insert other routines for the purpose of enhancing functionality. A keyboard hook is defined as a hook routine or program that implements the connection or insertion of routines using keyboard input. System 100 has access to all input data, and it can also affect the output data to apply certain changes, which are the objective of this invention. How this is accomplished is a function of the implementation. For example, if system 100 is implemented in the same program that writes the data, for example a file processor or a word processor, then system 100 can directly write the processed output data, modified as necessary. If however system 100 is implemented as a keyboard hook, especially in an interactive context where the user expects to immediately see every character typed, either in software by inserting itself in the operating system's or the application's input stream, or as hardware, e.g. as a device plugged between keyboard and computer, then it may change the output data by simulating the input of appropriate backspace or cursor movement characters, followed by new output data, to change data that already resulted in screen display. Even when system 100 is passive, i.e., it does nothing to actually modify the text, it is busy collecting context information, i.e., it maintains a local buffer of all recent input. This is necessary to know the full word that is currently being written, and also optionally to understand the context in which the last word or character appears, for example to identify an apostrophe character that can be expected to be part of a closing quote because system 100 has previously recognized an opening quote, so that it is not confused with an apostrophe that may have some other meaning that would affect the operation of this system. If system 100 is implemented in a way that it has direct access to text context information, for example as part of a word processor, or through an interface to a word processor that gives such access, e.g., MICROSOFT WORD scripting interface, or as a file processor that only deals with a continuous input stream, then context information can also be acquired directly on the text data itself, without needing to keep a copy of the recent data in a local buffer. There are however cases in which the text input stream is not linear, or it can be disrupted, for example when system 100 is implemented as a keyboard hook, and the user moves the Cursor Up or Down keys, or the mouse, to reposition the cursor. These cases can be detected (by detecting keyboard, mouse and other input events that affect the position of the text input position), but it is not always possible to reconstruct the new local context information (e.g., system 100 does not know where the cursor is, after a Cursor Up). In some cases the new context can be reconstructed by on-screen character recognition.

System 100 is character-oriented, i.e., it becomes active when certain characters are encountered in the input stream. Implemented in a keyboard input context, it reacts to certain keyboard keys. No special conversion keys are necessary. Rather, system 100 uses context information to give special meaning to an otherwise possibly standard (because it may also appear in the text) input character. In the algorithms of this system, context information is combined with the most recent input character, and also, optionally, in a dynamic way to the number of times the last input character occurs in a row, resulting, in the case of keyboard input, in a dynamic sequence.

System 100 described herein provides the ability to affect not only the current character, but also previous characters. System 100 described here implements "smart" procedures to process the combined context and input data, and generate output data in a way that results in new, reliable, intuitive and extremely useful text input methods which have practical applications in Italian, German, French and other languages which use Latin characters plus diacritical marks (but also to generate some special non-Latin characters). The present system is on one embodiment focused on the input of certain characters while the single characters are being written, and in particular Italian accented vowels, but also characters with diacritical marks in other languages, and also certain non-word characters (currency symbols, etc.). Only in certain cases does system 100 take action at the end of a word to re-correct or further modify a previous mid-word correction. This may happen for example when system 100 detects that an apostrophe originally interpreted to indicate an Italian accent was instead meant to be an English possessive which can only be recognized after a non-word character follows an "s" which follows an apostrophe. In general, system 100 intervenes in real time on each character. The definition of a word herein encompasses any word, punctuated or unpunctuated, accented or unaccented, contracted or uncontracted, with or without liaison, or any letter, portion, character, or subcombination thereof.

In one embodiment of the invention adapted to the Italian language, when writing or otherwise inputting text to any application, an activator event is used, which for the case of Italian is the apostrophe character. During character input, a correct or optimal accenting of a word is provided upon a first encounter or entry of the apostrophe character, for example when the apostrophe key is actuated during typing. If an alternative accented word form is desired, for example while inputting a French word during writing of Italian text, an additional encounter or actuation of the apostrophe character will select an alternatively accented word. The apostrophe character may further be utilized in various ways to override automatic actions provided by system 100, and with automatic detection and re-correction or further modification of "'s" possessive word forms in English. The software of system 100 works in one embodiment by functioning as an add-on on the keyboard input stream, but can also be directly embedded in text editing software, in the operating system, and on text systems of handheld devices, for example. It should be noted that an activator event may be indicated by one or more events or one or more sequences or combination of characters, input events, keyboard actuations, etc., so that the term activator event may be defined as encompassing these several events and sequences. For example, an activator event is defined in one embodiment as any key or character on a standard keyboard or in a standard character set (e.g., 7-bit ASCII). In one particular embodiment of the invention, the apostrophe character, or the apostrophe key, is defined as an activator event. Upon an activator event, such as the actuation of the apostrophe key or the input of an apostrophe character will cause system 100 to detect an activator event and provide an appropriate response, e.g., modification of a word immediately preceding the activator event, initiation of an IME loop as described herein, etc. In another embodiment, an activator event is defined as an activator event that is preceded by another character that, when appearing or occurring in combination, result in system 100 detecting an activator event. For example, an apostrophe character preceded by any vowel character is detected by system 100 as an activator event or an activator event so that system 100 provides an appropriate word modification or other response. In another embodiment, an activator event is defined as two characters appearing or input in succession, for example two vowels appearing in succession result in system 100 detecting an activator event so that an appropriate modification of the word or other response is provided. In one particular embodiment, an activator event or at least one character of an activator event is keyed or otherwise input in succession wherein each successive actuation or input of the activator event causes system 100 to initiate an additional appropriate response. For example, a vowel followed by a single apostrophe character or event causes system 100 to modify the word so that a first accented form of the vowel is provided, e.g., using a grave accent. An additional input or actuation of an apostrophe causes system 100 to provide a second accented form of the vowel, e.g., using an acute accent. A yet additional input or actuation of an apostrophe causes system 100 to provide a third accented form of the vowel, e.g., using a circumflex accent, and so on. System 100 may continue to provide additional accented forms until an entire list of accented forms is provided. At the end of the list, in one embodiment, system 100 again provides the first accented form of the word or vowel so that the list is effectively circular, or closed, and optionally including an unmodified form of the word or vowel, with or without the ending apostrophe activator event. In an alternative embodiment, the list is open so that at the end of the list, system 100 provides the original, unmodified form of the word or vowel, with or without the ending apostrophe activator event and system 100 does not go through the list an additional time. In an alternative embodiment, system 100 detects an activator event when an activator event or input event lasts for a predetermined duration of time, in combination with another character, or alternatively independently of other characters. For example, when an apostrophe character is input, but is actuated or keyed for a duration less than the predetermined duration of time, system 100 does not detect an activator event, and no modification of the word or other additional processing is provided. On the other hand, when an apostrophe character is actuated for a time at least equal to or greater than the predetermined period of time, system 100 detects an activator event and provides an appropriate modification or other response. In a particular embodiment of the invention, when an activator event is input for additional periods of the predetermined duration of time, each additional period causes system 100 to detect an additional activator event and to provide an additional modification or other response in a manner similar to that of where an activator event is activated and detected several times in succession as discussed, above. For example, if a currency character is defined as an activator event, then when a user holds down a representative currency character key for a duration of time, after a first period a first currency symbol is provide, after a second period a second currency symbol is provided, and so on, in either a closed or an open loop, until a desired currency character is provided at which time the user may release actuation of the activator event so that the currently provided currency symbol is maintained. Thus, an activator event may be defined to encompass a key actuation, singly or in a combination, a key actuation maintained (e.g., pressed) for a predetermined duration, a character in an input stream or text file, singly or in combination with other characters, and so on. An activator event therefore encompasses any one or more of the following events, alone or in combination: the same key pressed twice, the same character encountered twice, a predetermined key, a predetermined character, a predetermined key or character preceded by at least one or more other predetermined keys or characters, or alternatively succeeding the predetermined key or character, a predetermined key held down or otherwise actuated or maintained for a predetermined duration, optionally being preceded by another predetermined key or character, an accented key or character, a vowel key or character, an accented vowel or character, and so on. Thus an activator event encompasses input data and input events. Any one or more of activator events combinations as described herein, or variations and combinations thereof, or in addition to those described herein, may be recognized and detected by system 100 without providing substantial change to the present invention. Any one or more of the activator events or combinations as described herein may be optionally applied to any one or more of the embodiments or language implementations of the invention described herein or similar to those described herein without providing substantial change thereto.

Using different variants and combinations, the two aspects of the invention are: Using a key or character, an activator event, as part of an interactive, dynamic "input method editor" system, to handle accents in foreign words, and to otherwise write any combination of accents and special characters as desired. Each time an activator event is actuated in relation to a specific vowel or other context, system 100 generates a new character or character combination, in a loop. The order or hierarchy in which the characters are generated can be constant, context-based, or custom, or experience-based that depends upon previous selections. The activator event or key in one embodiment is occurrence of an apostrophe after a vowel in the Italian language, or alternatively an "e" after "a", "o" or "u" or "s" after "s" in German. The activator event that is used can be a function of the language for which system 100 is utilized according to letter and accent combinations that appear in the particular language applied.

The present invention automatically places the correct Italian apostrophe or accent on a vowel, based upon encounter or actuation of an activator event. In particular, when the apostrophe is used as the activator event, there may be existent cases where context based process is utilized to determine whether an occurrence of an apostrophe is word-related or not, that is intended for another purpose, for example as an opening or closing single quotation mark. In the event it is determined that an occurrence of an activator event is word-related, the English "'s" possessive is recognized and accounted for where appropriate. Also, with certain types of actions using an activator event where an apostrophe is entered as a recognized mistake, system 100 is capable of deleting the entry, or deleting the entry and replacing it with a space character, depending on Italian writing rules, for example, where the apostrophe can be used as part of a word, or between words rather than as an accent.

Discussion of the Italian Language

Compared to other languages, the relationship between Italian writing and pronunciation is quite easily specified by rules that provide relatively intuitive spelling and easy pronunciation of new words. One exception where most errors occur is related to the proper placing of accent and apostrophe signs in written text. Most Italian words end with a vowel. The pronunciation of Italian is such that the primary stress usually falls on the penultimate vowel, the second vowel counting from the end of the word, i.e., the syllable before the last one. Accents are used to indicate an exception to this rule. In Italian dictionaries and in some cases also to avoid ambiguities between words that have different meanings but differ only by the primary stress (e.g., tùrbine and turbìne), accents are used on vowels inside a word. In general writing, however, accents are used only on vowels at the end of a word, and indicate that the primary stress is on the last syllable (e.g., però). On some words (e.g., qui) the primary stress falls on the ending vowel, but no accent sign is used, a frequent cause of errors when writing as there is no specific rule; one must learn all the exceptions. Italian words are sometimes truncated (also referred to as elision), and in this case an apostrophe is used at the end of the word to indicate that a part of the word is "missing". If the last character of the truncated word is a vowel, the primary stress usually defaults to that syllable, which is marked by an apostrophe after it (not by an accent). In consideration of the evolution of language, writing rules change over time to accept truncated words as new words, which usually means that they are not written with an apostrophe any more, but rather with an accent, or with no sign at all. In practice, truncated words are sometimes so common that writers are not sure if the word is still considered truncated or not, leaving a doubt on whether an apostrophe should be used, or an accent, or no sign at all. For example, the Italian word poco is frequently truncated to po'. It is a common mistake to write it as pò. Another word, piede, has a truncated form, originally written as pie', now commonly accepted as piè in spite of the fact that it is less frequent than po'. Similar ambiguities also affect truncated words which are written without any sign on or after the last character, such as quale, which becomes qual, and frate, which becomes fra, whereas it is a common mistake to write qual' or fra'. In some cases an apostrophe is used if the following word is of feminine gender but not if the word is masculine (e.g., una altra becomes un'altra, but uno altro becomes un altro). On certain other words, for example weekdays ending in "ì" such as lunedì, it is a common mistake to omit the final accent.

A peculiarity of the writing of truncated words ending with an apostrophe is that if the last character of the truncated word is a consonant, then the apostrophe also acts as a spacing character between that word and the following one, i.e., no space character is used between the two words. A text processing system in accordance with the present invention removes an incorrect apostrophe sign and takes this into consideration in order to place an appropriate space character where necessary.

Different diacritical signs are used for writing in Italian. In addition to the apostrophe, the grave accent (as in È) and the acute accent (as in É) are used in everyday writing. The Italian National Standards Body (UNI) standard, UNI 6015-67 "Compulsory Stress Mark In The Italian Language Orthography", first published by the Italian National Standards Body in 1967, sets the rules by which grave and acute accents have to be placed on vowels in certain words. The circumflex accent (as in Î) is also sometimes used, but like the use of grave and acute accents in the middle of a word it is generally associated to a more sophisticated and in part old-fashioned writing style, whereas in modern Italian the trend is to let certain ambiguities be resolved by the context in which the word appears, and not using grave and acute accents inside words (but only at the end), or circumflex accents. The normal Italian writer is not expected to use such a style other than in exceptional cases, which could include the writing of French or Spanish words in an Italian context, but the invention described herein allows for input and processing of such custom characters as well.

Typically, even a skilled but non-professional writer of Italian does not know when to put a grave accent and when instead to put the acute accent. In general, this is not taught at Italian schools; instead a single sign having the appearance of a small opening parenthesis rotated by 90 degrees counterclockwise (similar to the "breve" character used in decimal positions 728 and 774 of the Unicode character set, i.e. "˘") is used as a "simplified fit-all accent sign". This sign, used exclusively in handwriting, is not defined by UNI 6015-67, and does not exist in printed text or on Italian keyboard layouts.

The use of proper acute and grave accents is in general always found in print, but is in general only learned as part of specific editorial, journalistic and printing training and studies. The fact that the Italian school system focuses on handwriting but not printing, and that personal computers are increasingly giving non-professional writers the ability to put words in print, results in an increasing degradation of the quality of printed words, which this invention aims to solve. The use of the apostrophe at the end of words, which historically indicates a truncation of an originally longer word, is in general taught at school, but remains a common source of mistakes in writing. Like an accent, an apostrophe at the end of the word adds emphasis to the last vowel of the word. This same emphasis is clearly reflected in the standard spoken language. This means that, on average, an Italian knows well when a word ends "either with a grave accent or with an acute accent or with an apostrophe", because this is how the word is spoken, but when writing the choice does not come intuitive. Certain words have a phonetic emphasis on the terminal vowel, but no graphical sign (accent or apostrophe) in the printed word (as in me and qui). This exception, whereby the printed form does not reflect the phonetic stress, is another frequent source of mistakes, so that accents and apostrophe signs are sometimes placed where they should not. Like all languages, Italian is in constant evolution. This means that there are cases and contexts, usually determined by editorial policies, in which certain words are written in a different way than for example the UNI specification indicates. An example of this is the word piè, which some prefer to write as pie' (as if it were a short form of piede, which historically it is). Other choices involve the use of accents, whereby for example some newspapers prefer to use acute accents in some cases where the UNI rules would require a grave accent, or vice versa. Another frequent source of diversity is the use of accents on capital letters. Some editorial styles prefer (often due to technical limitations) not to put accents on all-capital words, putting instead an apostrophe at the end of the word instead of a final accent, and simply remove accents in the middle of capital words, as is sometimes done in French. For example, MICROSOFT WORD includes an option to allow for accented uppercase in French, but no specific options for Italian. In these cases, where official rules lack, or where these are different than editorial choices, the most important rule becomes consistency, i.e., not to use one time one style and another time a different style in the same context. The invention described herein can be applied and programmed to enforce consistency in consideration of different preferences.

Ever since the introduction of typewriters, it has been a common convention in Italian to use the apostrophe sign after a vowel in those cases in which the proper accented vowel is not available on the keyboard or in the character set being used. Considering the needs of a very simple style of Italian writing (e.g., for personal correspondence), at least 7 accented characters are needed (à, è, é, È, ì, ò and ù). Anybody using all-capital words or sentences (e.g., in titles) will also need to use additional 5 capital accented letters (À, É, Ì, Ò and Ù), bringing the total to 12. More demanding writers and contexts need additional 4 characters (î, Î, ó and Ó), for a total of 16 accented characters.

The main other contexts in which apostrophe characters are used in Italian writing is as quote characters (to delimit a text, before and after it, as in 'text'), and after numbers (e.g., 5"2'). In these cases, the apostrophe character is sometimes used twice instead of a double quote character, which is in general more preferable (e.g., "text" instead of ''text''). An automatic text processing system must be able to recognize these cases, not only for example to convert the quotes into the proper opening and closing characters (e.g., MICROSOFT WORD, which converts 'text' to 'text' and "text" to "text"), but also, in the particular case of Italian writing, to determine the likely intention of an apostrophe character when there is ambiguity (in very rare cases a word may exist both with and without apostrophe or accent) or insufficient data (e.g., no matching entry in the dictionary of the software). In system 100 described herein, which can be applied so that pressing the apostrophe key once places the correct apostrophe or accent on a word (e.g., perche' becomes perché), and pressing it again produces different variations (e.g., perché, perchè, perchê, perche', perché', etc.), the recognition of a context where an ending quote has to be expected (because an opening single quote appeared within a certain range before the current position, as in 'perch) allows system 100 to automatically interpret the first input of the quote character as an acute accent ('perché), and the second input of the same character as the closing quote ('perché'), instead of an attempt to write 'perchè (forcing an incorrect accent to be written). Similarly, if a word for which system 100 cannot apply any Italian rules (e.g., a completely unknown word which is not even recognized as a likely foreign word) is typed in a context where a single ending quote is to be expected, system 100 may be programmed to propose as a first output character a closing quote, rather than an accent (e.g., 'dedededo abababo' instead of 'dedededo abababô).

Apostrophes may also appear in Italian writing as part of a change of language context, which could be for a single word, or for longer parts of text. System 100 described here can be programmed to recognize apostrophes used in other languages, e.g., in German and English genitives and abbreviations (as in Eva's Apfel and eight o'clock), which have no match in Italian. While the fact that German is an official language in Italy and English is the most frequently-used second language is one consideration, such a set of rules can improve the overall reliability of system 100 so that it produces little or no incorrect output even when processing (trying to apply Italian accent rules) long non-Italian texts of any language based on Latin-writing.

Variations of the Apostrophe Character

Some computer keyboards reflect the fact that the 7-bit ASCII character set contains both an "acute apostrophe" and a "grave apostrophe" character (decimal codes 39 and 96, respectively), and, accordingly, have keys to input both characters. This is a common cause of inconsistencies when writing, since it is desirable that in a text only one type of character be used to represent the apostrophe (but not for opening and closing single quotes, where, depending on the font being used, the two characters are appropriate to differentiate between opening and closing single quotes). System 100 described herein can be programmed to convert, for example, the apostrophe character entered with the grave key to the "acute apostrophe" character, leaving the character unchanged if it is used as a single quote character. Some keyboards and character sets have an even wider range of characters and keys that can be used, deliberately or by mistake, for the same purpose.

Discussion of Other Languages

Other languages have in part needs similar to Italian, but cannot always be algorithmically solved with the same accuracy. German for example has upper and lower case versions of "ä", "ö" and "ü", which are written as "ae", "oe" and "ue" when these characters are not available. The special character "β" (lower case only) is expanded to "ss" when not available as well as always in upper case ("SS"). Different techniques have been proposed to automatically process German text files to add or restore the missing Umlaut characters, but none with the reliability that system 100 described here achieves for Italian and its special characters. The interactive mode of the present invention, where the user could for example enter "o" and then repeatedly press the "e" key to toggle from "ö" to "oe", could be of great help to combine automatic procedures with manual corrections during typing.

In Spanish vowels may have an acute accent, and the apostrophe character is only used for quotes (it is not part of words, as in Italian). This would make it possible to use the apostrophe key after a vowel to enter the vowel with an acute accent. A similar sequence could also be used for other Spanish characters that are variations of characters without diacritical signs, such as "ñ". Apostrophe characters that are part of quotes, or English possessives, could be recognized by the more generic procedures that are part of this system. Writing a vowel followed by an action indicating an accent is more intuitive for the writer (as it is more similar to handwriting) than system 100 currently employed on Spanish personal computers, which requires that the user first enters a "dead key" indicating the desired accent, and then the vowel.

French employs an even greater variety of characters, as it uses acute, grave, circumflex and dieresis signs on top of vowels, plus some other characters, like "ç". Because of this variety, which requires a lot of keys on a keyboard, the interactive use of this system could be of great advantage on a system with a reduced number of keys, also possibly in combination with some language-oriented algorithms (as for the other languages discussed here).

Other Applications

The above examples for Italian, German, Spanish and French illustrate how a certain text context followed by a certain input results in a certain algorithmically-modified output, so that system 100 can optionally be modified in a dynamic fashion, and controlled by the user. In an application of system 100 where repeated input of a certain key is provided, for example the dollar key, produces different, alternating currency symbols, (e.g., euro, yen, pound, etc.) can be implemented as a subset of system 100 described herein. In one embodiment, system 100 intercepts repeated inputs of certain keys, and sends "fake" backspace characters in the input stream, followed by new characters, to provide the desired character combination output. For example, system 100 may be utilized in lieu of or in conjunction with a euro key, wherein the position of the euro key on computer keyboards is as of yet not completely standardized, and is likely to change in the future, wherein a special euro key is provided. System 100 in accordance with the present invention is capable of implementing a universal currency key.

Non-Linguistic Factors

Utilization of Italian letters with diacritical signs exceeds the limits of the character sets and keyboards originally designed for English. The original ASCII and EBCDIC character sets, still in use today, support none of these characters. The present invention provides automatic conversion both from an accented Italian which requires support by a character set newer than ASCII, to an Italian using standard ASCII character set, and to restore the accented Italian characters based on a 7-bit character set such as ASCII. The present invention effectively eliminates accent-related inconveniences caused by the use of 7-bit bottlenecks that are still common in the computing world, especially in consideration of the increasing interconnection of different systems.

Text Normalization

When a user of an Internet search engine or dictionary lookup software enters a word or sentence, the search key and the entries being searched should match. However, considering that for example calamità, calamitá and calamita' are three different ways in which, in practice, the same word may be written, while the word calamita (with no sign) is a different word with a different meaning, an advantage is provided where both the search key and the text being searched are normalized to a common format, using system 100 in accordance with the present invention. Word format normalization is provided using the same or similar rules that are applied in real time where text is being typed, for example. The invention described herein normalizes text using the correct accent and apostrophe characters, or using only apostrophe keys (i.e., only 7-bit ASCII text), and, whatever the desired format, is capable of converting Italian text from one format to the other, without loss of information, and while maintaining a natural text readability, i.e., without introducing control codes which are perceived by the human reader as "artificial" or unreadable.

Integration with Other Systems

Operating system support for input methods provides processing of user input regardless of the target application. In one particular embodiment of the invention, one or more application-independent layers are provided by some operating systems, for example MICROSOFT WINDOWS, as well as by some applications, for example MICROSOFT WORD. An application-independent layer may consist, for example, of a set of functions dedicated to error detection and correction. System 100 described herein is capable of integrating with such a set of error management functions. System 100 can also be directly integrated at the application level, for example in a word processor. In this case, text context information, as well as input data, is directly accessible to the method employed by the invention, which can also directly produce output in the format used by the application itself.

When integration at the operating system level is not possible, and integration within the application is either difficult or insufficient, techniques may be used to obtain text context information, and to intercept user input, and to then forward such processed input to the operating system or to an application in real time. For example, text context information is acquired by system 100 by monitoring the keyboard and display activity. Such context information may be used to apply different rules based on both the text context and the user input. The resulting output is then forwarded either to the operating system, or to the keyboard control system, acting as if the user typed the data, or it is sent directly to the application. On architectures where it is possible to only detect, but not to remove the original input stream, the text processing method may insert appropriate "cursor", "backspace" and "delete" characters, in addition to new text characters, to the input stream in order to force applications to replace a series of input events with a new series of processed events generated by the text processing function.

Several other cases of possible and useful integration of this invention are known. In a particular embodiment, text search procedures, as used within word processing and database applications, as well as on the Internet utilize system 100 both with the search string or with the text being scanned so that both are expressed in a standard and correct form, and so more efficient results are produced.

Figure 3:
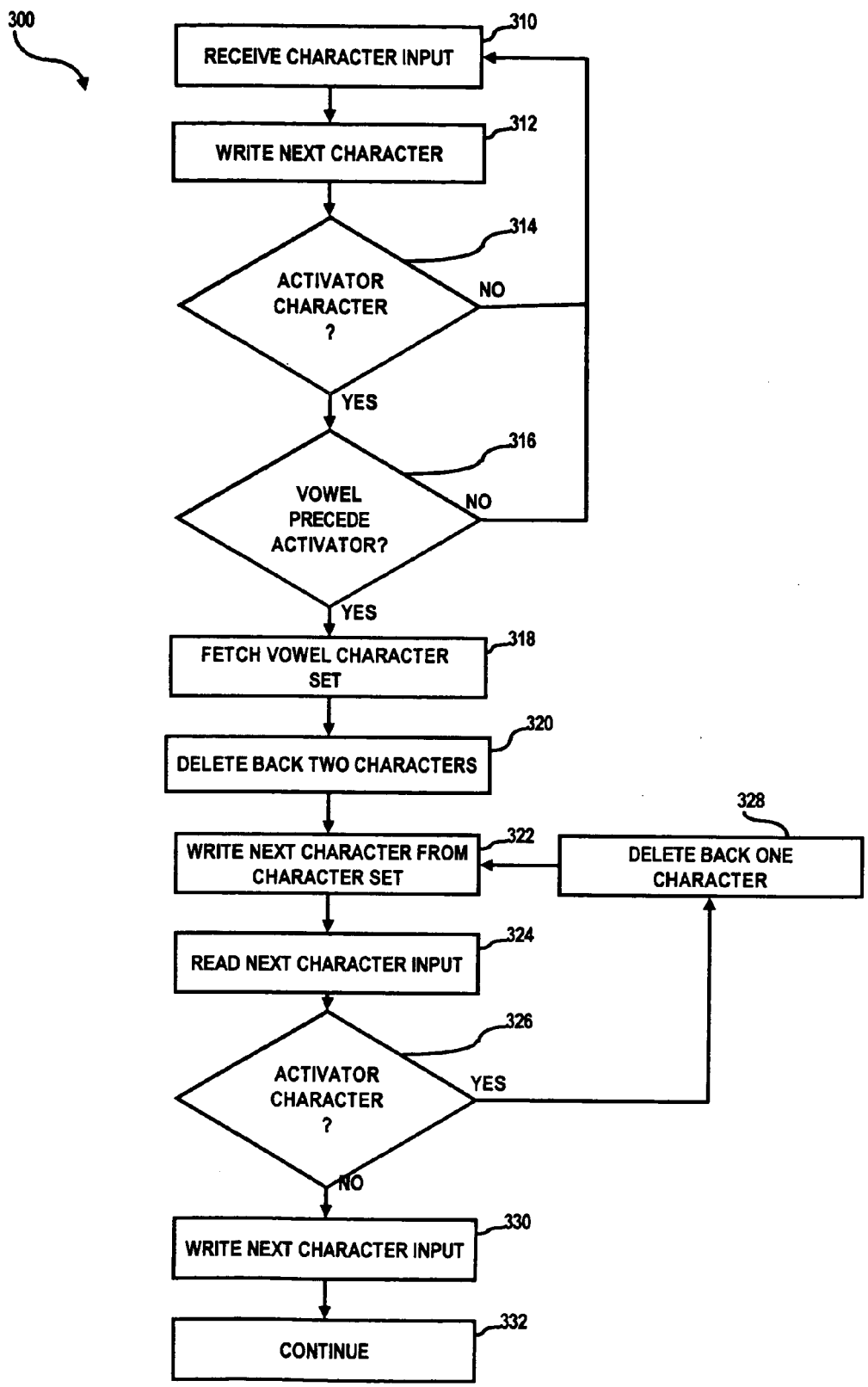
FIG. 3 is a flow diagram of a method for processing text input in accordance with the present invention.

Referring now to FIG. 3, a flow diagram of a method for processing text in accordance with the present invention will be discussed. Method 300 provides a first step 310 for receiving character input. As characters are received and read, the characters may be written at step 312. For example, if the character "e" is received, the letter "e" may be written to a display device so that the character "e" may be viewed on the display by the user. A determination is made at step 314 whether a received character is an accent indicator character. For example, the apostrophe character (') may be assigned as the accent indicator character. A determination is made at step 316 whether a vowel precedes the accent indicator character. In the event a vowel does not precede the accent indicator character, then the accent indicator character is regarded as intended to represent its nominal meaning, for example an apostrophe, and method 300 continues with step 310 by continuing to receive further character input. In the event that a vowel does precede the accent indicator character, then method 300 interprets the vowel and accent indicator character combination to represent the desire to utilize an accented vowel. In this case, the character set for that vowel that includes a range of accented vowel characters is fetched at step 318. Method 300 then deletes backwards two characters at step 320 to delete the vowel and accent character tandem. The next character from the character set is read at step 322 whereby the next vowel character is written in place of the previously written vowel and accent indicator character tandem. When step 322 is initially executed, the next character written is the first character in the vowel character set. The next character input is then read at step 324, and a determination is made at step 326 whether the next character input is also the accent indicator character. The accent indicator character may be repeatedly input (e.g., the user repeatedly hits the accent indicator character on the keyboard one or more times in succession). By repeatedly inputting the accent character indicator, the user is able to scroll through the vowel character set until the correct accented vowel character is written. In the event the next character is the indicator character, for each input of the indicator character, one character back is deleted at step 328, thereby deleting the previously written vowel character, and the next character from the vowel character set is written at step 322, and the next character input is read at step 324. This loop may continue until the desired vowel character, with correct accent and correct punctuation, is written. When the vowel character set is fetched at step 318, the vowel character set may be written in a circular buffer so that when the end of the vowel character set is reached, the vowel character set may be read again from the beginning at the first vowel character upon successive input of the vowel indicator character. In the event the next character input is not the vowel indicator character, for example, a space character, the next character input is written at step 330, and method 300 may continue at step 322.

Accented Character Sets

The user may be provided with one or more available accented character sets depending upon the level of writing desired. For example, at least one or more of the following accented character sets may be available:

Set 1: [•■ ✦ ★ ✘ ✱ ⚹]
Set 2: [☾ ☉ ▢□ ☾ ☉ ▢]
Set 3: [✘ ☉ ✱ ●]

Set 1 may be described as comprising characters: lower case "a" with grave accent, lower case "e" with acute accent, lower case "e" with grave accent, capital "e" with grave accent, lower case "i" with grave accent, lower case "o" with grave accent, and lower case "u" with grave accent. Set 2 may be described as comprising five characters: capital "a" with grave accent, capital "e" with acute accent, capital "e" with grave accent, capital "o" with grave accent, and capital "u" with grave accent. Set 3 may be described as having four characters: lower case "i" with circumflex accent, capital "i" with circumflex accent, lower case "o" with acute accent, and capital "o" with acute accent.

Character sets may be selectively available depending upon the needs of the writer and the level of formality required. For example, only Set 1 may be available for very simple Italian writing style such as for personal correspondence. For writers requiring accented capital letters, for example when writing titles, Set 1 and Set 2 may both be available to the user or system. For more demanding writing, Set 1, Set 2, and Set 3 may be available, for example, when a higher level of formality is desired. One or more vowel character sets per vowel may be created based upon the available character sets. The created vowel character sets may also include essential accented vowels with punctuation as necessary so as to be able to discriminate between accented vowels, with and without punctuation, and non-accented vowels, with and without punctuation. For example, the following vowel character sets may be created if only Set 1 were available:

Set a: [a • •① a①]
Set e: [e ◆■ ◆①■ ① e①]
Set E: [E ★ ★① ☞①]
Set i: [◎ ✖ ✖① ◎①]
etc.

If Set 1, Set 2, and Set 3 were all available, Set a and Set e are unchanged, but Set E and Set i, for example, are enlarged to include the additional available characters. Thus, new and/or enlarged vowel character sets may be created as appropriate:

Set E: [E ★ ★① ① ①① ☞①]
Set i: [◎ ✖ ✖① ✖ ✖① ◎①]
Set I: [I ▢ ▢① ① ①① ❘①]
etc.

The vowel character sets may be ordered or sorted according to the frequency of occurrence in the language of interest such as Italian so that the most frequently occurring character will be selected first, the second most frequently occurring character will be selected second, and so on, in order to maximize the efficiency of selecting the desired accented or non-accented, punctuated or non-punctuated vowel. The initial output is also affected by the actual word in the text stream wherein the output is based upon the context.

Figure 4:
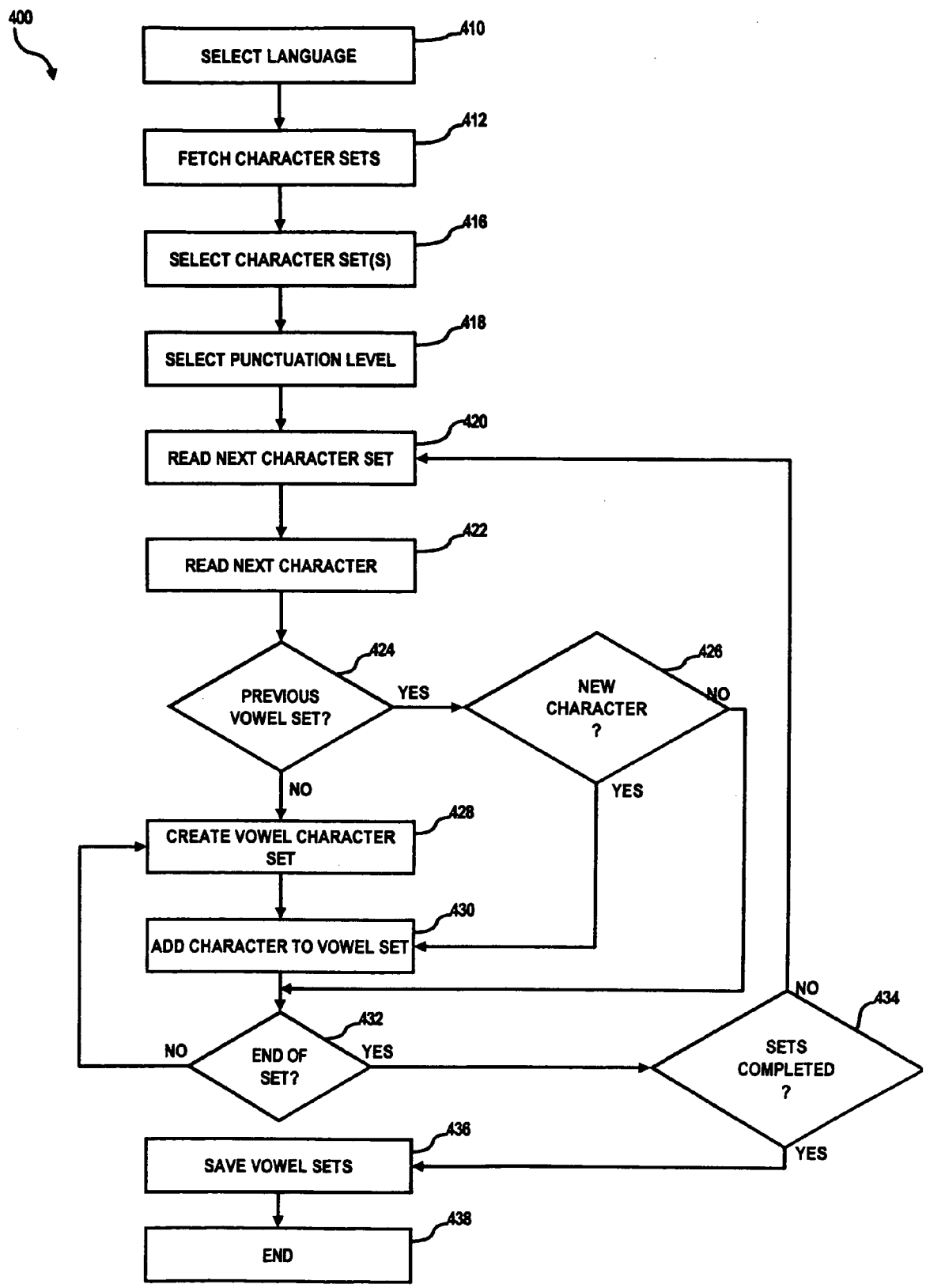
FIG. 4 is a flow diagram of a method for processing text in accordance with the present invention.

Referring now to FIG. 4, a flow diagram of a method for processing text in accordance with the present invention will be discussed. Method 400 is executed by system 100, and in one particular embodiment, by computer system 200. Method 400 is utilized to create and modify the character sets used by system 100 for a given language. A desired language is selected at step 410. One or more character sets for the selected language are fetched at step 412. One or more of the fetched character sets are selected at step 416 according to the style and formality of language to be utilized. A punctuation level is selected at step 418. The next character set to be used is read at step 420, and the next character is read at step 422. If there is preexisting a previous vowel or character set, such a determination is made at step 424. If there is no previously existing vowel or character set, a vowel or character set is created at step 428, and the character is added to the vowel or character set at step 430. If there is a previously existing vowel or character set, a determination is made at step 426 whether the character is a new character, and if so, it is added to the previously existing character set. Otherwise, the method continues at step 432. If an end of the vowel or character set is not reached as determined at step 432, then additional vowel or character sets having additional vowels or characters are created. A determination is made at step 434 whether the character sets are completed, and if not, method 400 continues execution at step 420. If the character sets are completed, vowel and character sets are saved in system 100 at step 436, and method 400 ends at step 438.

Figure 5:
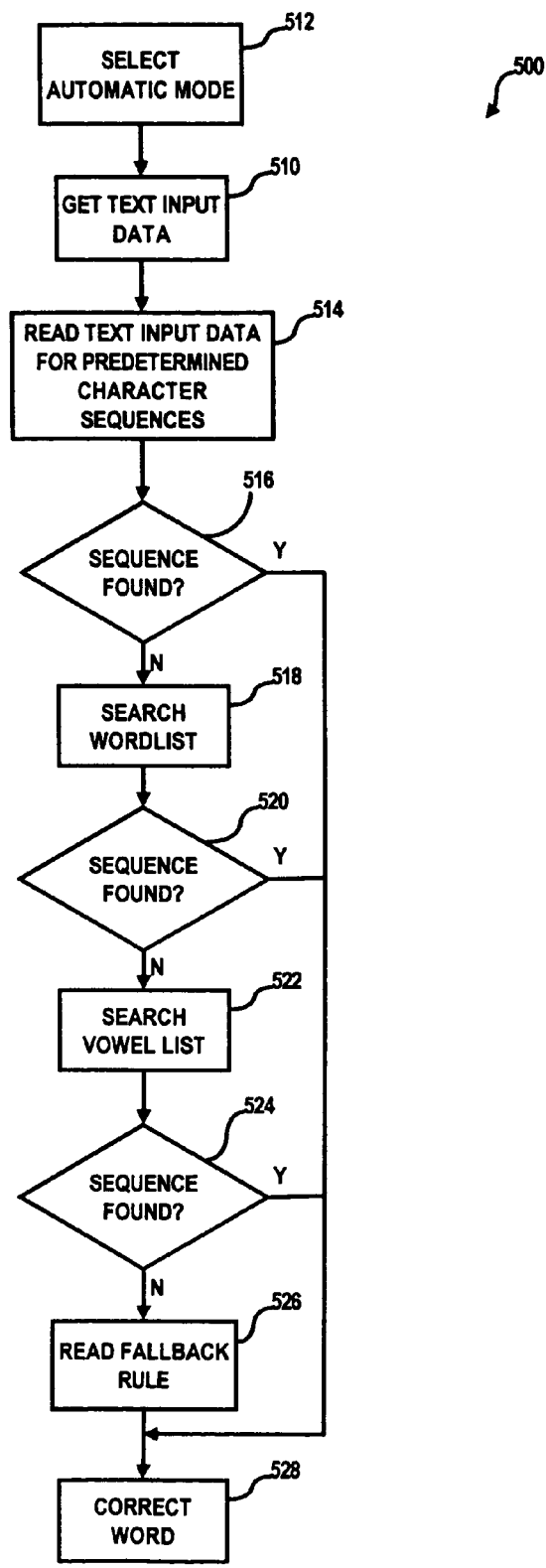
FIG. 5 is a flow diagram of a method for processing text in accordance with the present invention.

Referring now to FIG. 5, a flow diagram of a method for processing text in accordance with the present invention will be discussed. Method 500 begins with the selection of automatic mode at step 510. Text input data is received at step 512, such as from keyboard 112, file 114, microphone 116 via speech-to-text engine 118, graphical image file 120 via OCR 122, etc. The text input data is read for a predetermined character sequences at step 514. For example, the occurrence of an activator event such as an apostrophe that is preceded by a vowel is read and detected. A determination is made at step 516 whether a rule for the read sequence is found, for example is a rules list. If a rule for the read sequence is found, the word is corrected at step 528, for example by removing the text sequence and replacing it with a corrected sequence. For example, a vowel followed by an apostrophe is replaced with an accented vowel character according to the rule for the input character sequence. If the rule for the input character sequence is not found, a wordlist is searched at step 518 for a correctly accented version of the input word according to the read text input data. If the word is found, the word is corrected at step 529 wherein in the wordlist replaces the word in the text input sequence. Otherwise, a vowel list is searched at step 522 for a list of possible accented vowel sequences according to the read input sequence. If a vowel sequence is found, the word is corrected according to the vowel sequence at step 528. Otherwise, a fallback rule is read at step 526, and the word is corrected according to the fallback rule.

Figure 6:
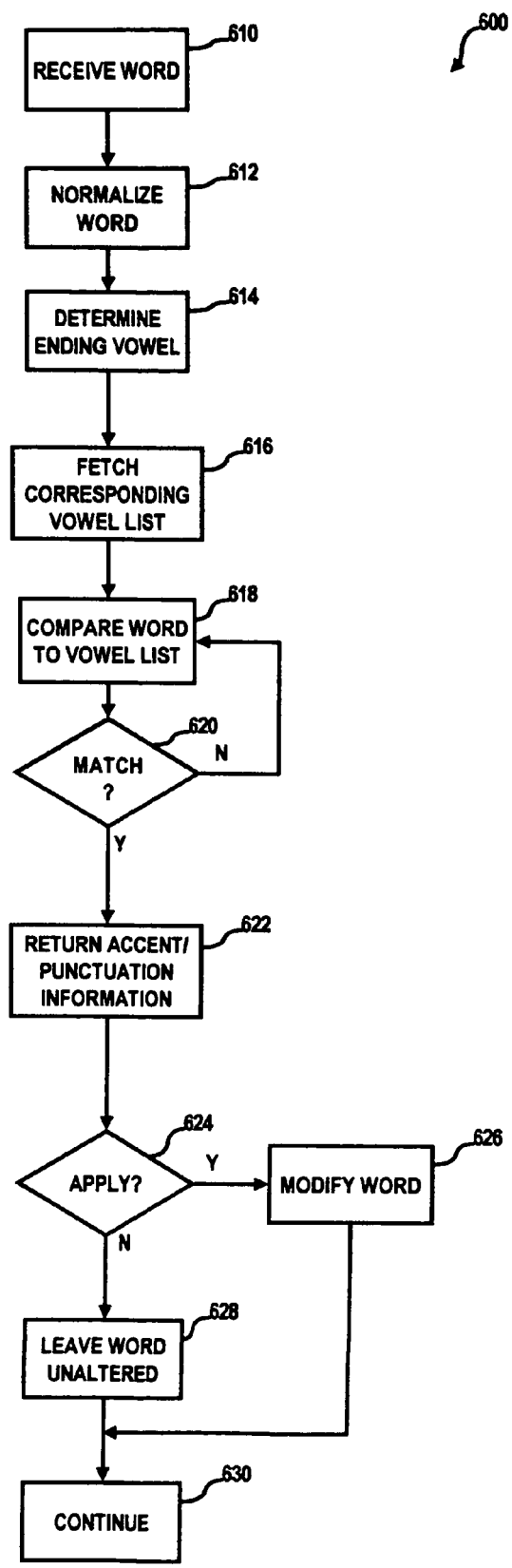
FIG. 6 is a flow diagram of a method for processing text in accordance with the present invention.

Referring now to FIG. 6, a method for processing text in accordance with the present invention will be discussed. Method 600 begins with the reception of a word to be processed at step 610. The word is normalized at step 612, for example any accented characters are ignored as far as the present accenting is concerned so that the accented character is treated as its root letter character, and optionally as the root letter followed by an activator event. Alternatively, extended character set representations of words, such as 8-bit ASCII, are normalized by being converted to 7-bit ASCII character set words. The ending vowel, if any, is determined at step 614, a corresponding vowel list is fetched at step 616. The word is compared to the vowel list at step 618, and a determination is made at step 620 whether a match in the vowel list is found. This process continues until a match is found, at which time the accent or punctuation information is returned. A determination is made at step 624 whether to apply the returned accent or punctuation information, and if so, the word is modified accordingly at step 626. In the event it is determined not to apply the returned accent or punctuation information to the word, the word is left unaltered at step 628, and method 600 continues at step 630 for additional words.

Overriding Automatic Action

System 100 is capable of overriding or correcting an automatic action generated by system 100, and is further capable of remembering the override event to be applied in future events. Possible variations and extensions, implemented in software, range from a way to use the intercepted input to take quick notes and then paste them, to a way to generate different currency symbols using a single currency key or symbol. System 100 places an information box near the current cursor position, with notes about correction that was made or future results of repeated presses. The following are examples of different actions that can be performed by system 100 described herein.

| User Input | System Output | Note |
| --- | --- | --- |
| e' | è | Changed to grave e |
| é | è | Changed to grave e |
| perche' | perché | Changed to acute e |
| perchè | perché | Changed to acute e |
| po' | po' | Unchanged (correct) |
| pò | po' | Changed to apostrophe |
| po' | po' | Consistent apostrophe style applied |
| quà | qua | Accent removed |
| qua' | qua | Apostrophe removed |
| qual' | qual | Apostrophe converted to space |

The above examples reflect rules that are built into the algorithms for Italian which are part of system 100 in an Italian based embodiment. These rules ensure that system 100 exhibits a reliability exceeding 99% without even requiring an exhaustive dictionary of words.

The following examples show the effect on a more dynamic situation, where the user repeatedly presses a certain key to intentionally achieve certain results (even overriding Italian rules, in an Italian context).

| User Input | System Output | Note |
| --- | --- | --- |
| po" | pò | Second press of " ' " starts loop |
| e" | é | First apostrophe = è, second = é |
| e'" | ê | Third press = ê |
| e"" | è' | Fourth press = è' |
| e""" | e' | Fifth press = e' |
| e"""" | è | Sixth press restarts from è |
| è | è | No change |
| èè | é | Same loop as that activated by " ' " (é is easier to reach than é) |
| $ | $ | No change |
| $$ | € | Second press = euro sign |
| $$$ | ¥ | Third press = yen sign |
| $$$$ | $ | Back to step 1 |
| oe | oe | No change |
| oee | ö | Second press of "e" starts loop |
| oeee | oe | Third press toggles back to beginning |
| oe | ö | Variant of the above |
| oee | oe | Loop like above, but in different order |
| ö | ö | No change |
| öö | oe | Same loop as that activated by "e" (less practical, though) |
| ss | ss | No change |
| sss | β | Triple s begins German sharp-s/ss loop |
| ssss | ss | Back to step 1 |

The above are some examples of what system 100 executes in a "dynamic" mode. The dynamic mode causes different characters to be displayed one after the other which, when system 100 is implemented as a keyboard hook, is achieved for example by sending fake character and backspace inputs to system 100, and can be applied in different ways based on different activator event keys, different output sequences, which can be static or dynamic, e.g. "learning" from past selections, and also in combination with Italian rules to generate the most likely desired output first. Variations include, for example, causing an above "ss" cycle to break the loop after the third "s" is pressed so that repeated actuations result in the same amount of "s" characters, or the insertion of just one more step to generate three "s" characters in a row, but then restart from "ss", "β", etc. The loops can be closed, beginning again from a certain step, which is not necessarily the first step, such as with a circular buffer, or open wherein after a predetermined number of identical inputs, the output becomes identical with the input, and consist of any number of entries.

A learning mode is provided by system 100 where the most frequently used character or currency symbols could always be output first in the loop, depending upon the statistically most encountered selection. The examples illustratat that system 100 is capable of utilizing more than one activator event, for example, apostrophe, accented character, specific currency character, generic currency character, to access a given character loop or set. Thus, with some keys and characters, such as apostrophe, are utilized generically and combined with a previous character, while other keys and characters, such as accented characters, serving both as a reference to a base character and also as an activator event.

The order according to which the items in these dynamic loops occur are defined as static (program-defined), static (defined by user in program settings), dynamic (frequency-based), dynamic (frequency-based, with optional adjustable limit before changes occur), and dynamic (combination of the previous ones with Italian language rules which to calculate the most likely cases). For example, system 100 could be programmed in a manner such that the order in which the items appear is changed only after two (or one, or three, or more, etc.) consecutive selections of an item which is not already at the first place in the list, or it could be set such that the order changes after the total number of selections in a given timeframe, which can be unlimited, i.e., not time related at all, and is such that a certain item is desired over another one at least 5%, or 10% more times, etc.

The first press of an apostrophe automatically outputs a word or character having the correct accent in accordance with the rules described herein without further user intervention. Subsequent consecutive encounter or actuations of the activator event, the apostrophe, activate a dynamic manual selection mode. Other peculiarities of Italian are also considered. For example, instead of, or in addition to, an apostrophe key or character as a desired way to initiate the automatic placement of the sign which system 100 determines to be the best, since in Italian a vowel almost never appears twice, each vowel itself could act as an activator event which, encountered or pressed more than once, initiates a character selection loop. System 100 may be programmed to implement this and other similarly based modes.

A rule-based approach is also possible for languages such as German which has the special characters "ä", "ö", "ü", "β", "Ä", "Ö", "Ü", where the context can facilitate system 100 to determine whether "oe" is more likely to mean "oe" than "ö", for example, and propose that as a first choice when the user writes "oe", and the other when the user presses "e" again ("oee"="ö"). As with an Italian embodiment, repeated identical characters could be used instead of the vowel+"e" combination.

Additional ways for the user to specify a certain accent may be implemented by system 100. For example, the user could use the characters "/" or "\", or both combinations thereof to indicate a circumflex accent, before the apostrophe to quickly specify the accent. For example, "a\'" would mean "à", and "a/'" would mean "á", and "a\/'" or "a/\'" would mean "â". Another variant is the placement of the symbols before the vowel, as in "\a'", etc.

System 100 provides different ways for the user to override system 100, and just enter exactly what is typed. System 100 can for example use the Num Lock key for this purpose. On one hand, system 100 ensures that Num Lock is always switched on if the user desires, and on the other it then interprets any Num Lock actions as on/off commands for its text processing system as described here. The Num Lock is a key that effectively has little practical use, so this action provides two benefits in one. Scroll Lock or other keys could also be used in a similar manner. For temporary on/off, it is possible to hold down certain keys while entering text that would otherwise be modified. The user can go back after an automatic correction, and rewrite the text so that it is not modified a second time.

Examples of additional program options include a setting to make sure that accent changes in the middle of a word, as opposed to changes at the end of a word, are applied only while typing, and not on file operations. This would be in the assumption that accents placed in the middle of a word, for example which typical Italian never uses, have been placed with proper knowledge. More options provided by system 100 include the possibility to scan a text file for patent character set errors, which might for example have lead to the word "perché" to become "perchX" or "perch{".

Input and Output Interfaces

Depending on the hardware and software with which system 100 of the present invention is utilized, examples of sources from which input data can be acquired include the operating system, an input method system interface, an error-handling interface, an accessibility interface, e.g., as used to handle input, output and context for blind users, or an application such as piece of software, or the keyboard system or other hardware, or display memory, or computer memory. Text context data is acquired either from the operating system, or from an input method system interface, or from an error-handling interface, or from an accessibility interface, or from an application, or from display memory, or from computer memory, or by buffering the input data. Output is sent to the operating system, or to an input method system interface, or to an error-handling interface, or to an accessibility interface, or to an application, or to the part normally receiving data from the keyboard system. If the input stream cannot be intercepted for exclusive use, then output is generated in a way as to produce the deletion and replacement of the parts that require modification, for example by inserting "cursor", "backspace" and "delete" control commands as appropriate.

Input and Context

System 100 recognizes certain input events as causing a disruption of context, requiring the collection of new context information. For example, when the user moves the cursor with the mouse, or moves the cursor up or down, or selects an application command via the mouse or keyboard, system 100 takes steps to try to reconstruct the new text context, i.e., the text surrounding at least preceding the new cursor position. Recent versions of operating systems such as MICROSOFT WINDOWS, provide dedicated interfaces for this purpose, designed to give text context data for accessibility purposes, e.g., to read out the current text context to a blind user, or as part of an input method system which system 100 described here embodies for languages such as Italian. If context collection through this type of system calls is not possible, it may still be possible to obtain equivalent information directly from the application being currently used. For example, applications such as MICROSOFT WORD provide such information. On systems where neither the application nor the operating system provides such information, it is always possible to buffer the input data as it is being typed, and resort to that information as the context data. However, when the text context is lost, for example after a vertical cursor movement, it is desirable to utilize different techniques to collect text context information, at least for the part immediately preceding the new cursor position. On-screen optical character recognition (OCR) is one such option. System 100 employing on-screen OCR recognizes the cursor because it is the only object on screen that flashes. Alternatively, system 100 queries the operating system, and then analyzes the surrounding screen bitmap for text patterns. Other techniques are also utilized. For example, with certain operating systems and applications, it is possible to directly access the region of memory that provides the necessary text context information. Where no context is available, system 100 utilizes generic, not context-specific, likelihood rules.

Context Information

Context information provides the following data: the last, current, word up to the current insertion or input point, information on whether the context before that word required a capital initial, that is an upper case character, information on whether the context before the current insertion or input point includes a single opening quote with no corresponding closing quote, and text language for the block including the last word, if specified by the user or otherwise known. For one embodiment of system 100 in accordance with the present invention, for example on a slower system, word context information alone, such as the last word, could be sufficient, depending on the requirements concerning execution speed, memory use and output quality. Word context is an important piece of context. Even partial word context is useful, for example when the language rules include suffix rules.

The special handling of a single quote character is utilized for Italian and other languages where one embodiment utilizes the apostrophe character, or possibly any character resembling it, such as the "acute" character, as an activator event. Defined as variables, in a possible implementation the context variables could be:

context.buffer=context string and data
context.word=string
context.capital=yes/no
context.expectsinglequote=yes/no (or counter)
context.language=language code
context.typemode=insert/overstrike These variables are provided by the host environment, such as the input method interface, word processing application, etc., or are calculated by system 100.

In the context of an interactive use, for example system 100 applied while the user is typing, context.buffer is an optional copy of the local text region, which is dynamically maintained by system 100 while the user is entering text. The purpose of this data is to be able to provide information about the current word, i.e., to construct context.word, when system 100 is applied to an environment where the application in use, or the operating system, are unable to provide text context information. This data consists of a string of characters that represents a "sliding window" region of the text currently being typed, plus status variables that indicate the cursor position with respect to the buffer, and the size of the buffer. When the user types characters of text, these are appended to the string in context.buffer until a maximum size has been reached, after which new characters are added, and old characters are discarded from the buffer, as necessary to maintain the maximum buffer size where one has been set. Depending on the implementation, characters may be discarded at the beginning of the text buffer, but not at the current word, if the cursor is at the beginning of the buffered data, or at the farthest point from the cursor position, or using other preferences. When the user uses the cursor left/right keys to move the cursor in the application currently in use, the cursor position in the local buffer is also updated accordingly. During cursor left/right events, the cursor position may temporarily fall outside the current window of buffered characters without requiring the buffer itself to be reset, but if text is then added outside the buffered region, then the buffer contents may be reset, as the contents of neighboring regions of text is unknown. The context buffer data also is reset when the user uses the cursor up/down keys, or when the mouse is used to move the cursor, or to execute commands, or when certain combinations of keys are pressed to execute a command, if system 100 cannot determine how these events affect the text currently being written.

A word as stored in context.word is defined as a sequence of characters building a single word, such as it would appear in a dictionary. This includes, without being limited to, letters, digits, and the dash sign. An apostrophe sign before a word is not considered part of the word for the purposes of one embodiment of system 100. An apostrophe sign, or other sequence of one or more non-word signs after the last letter of a word is processed as a possible activator event sequence when system 100 is applied to Italian and certain other languages, rather than being accepted without action as part of that word. If the word context cannot be determined, either interfacing with the application, or interfacing with the operating system, or through the local context buffer context-.buffer, then the word context string is left empty. This may for example occur if system 100 is poorly integrated with the host environment, so that context information can only be acquired through buffering of the input characters, and is lost after vertical cursor movement. A buffer holding more context text than the current word is both desirable and useful, as it avoids having to request context information, which may also be unavailable, to the operating system or application after horizontal cursor movement and text deletions going backwards beyond than the current word. A possible implementation is circular text buffer of constant length, from which the current context word is derived as necessary.

The variable context.capital is set to yes if, according to the punctuation or other context attributes (e.g., beginning of sentence), the word stored in context.word would need to be capitalized. This information is not used for capitalization purposes, but rather because some accent rules need to know if an unknown word is likely to be a proper noun or not, and proper nouns can be recognized by the capital initial, but only if such capital initial is not context-specific. The variable context.expectsinglequote would be set to yes if it was determined from the context that, within a certain range, the maximum of which can be specified, e.g., as one or two sentences from the current position, or as a certain number of characters or words, going back from the current position, certain characters were found which are normally used as an opening sequence for certain types of quotes for which the closing sequence may consist of one or two consecutive apostrophe or grave characters, but no such closing sequence was found. Knowledge of this is valuable because if an apostrophe is for example found immediately after an unknown word, especially where it is intended to produce good results even with unknown words, it might indicate an accent, or instead a closing quote. Certain rules for placing accents where automatic correction is desired and no user preference is given leave an apostrophe or grave character unchanged after an unknown word, if a closing single quote is expected. A single opening quote is in general defined as an apostrophe sign (decimal ASCII code 39, or similar characters), a grave character (decimal ASCII code 96, or similar characters), or a comma (decimal ASCII code 44, or similar characters) immediately preceding a word. An additional optional condition to recognize such an opening sequence is where the sign does not immediately follow a letter, or where it immediately follows a space, line feed, or appears at the beginning of a sentence, or where it immediately precedes a letter. The sign may also appear twice, i.e., consecutively, or for example in single-quotes within double-single-quotes within double-quotes, in which case it is expected that the context.expectsinglequote condition be not cleared until all quotes are matched. For this purpose, a counter field to this information is associated. The context.expectsinglequote condition is cleared after a certain number of characters, words or sentences, in order to avoid the carrying over of possible interpretation errors. Furthermore, the single quote counter is not be increased or decreased for single quotes that are recognized as having a specific purpose that does not require paired sets of quotes. This applies, for example, to single quotes appearing as part of a quoted possessive or negative or known abbreviation form, as in "Will said 'Don't play with Mary's ball before 5 o'clock, or I'll be very angry,' and went to work." Known patterns such as "*'t", "*'s", "o'*", "*'ll" ("*" denoting any word-string) could be part of a list used to exclude certain single quotes from the count of opening and closing quotes.

The variable context.language indicates the language of the current context. This is used by certain accent rules because, if a word requiring accent action is found that is unknown, then no action should be taken if the word is known to be not Italian or another language for which this system can be applied. As an example, if the implementation is based on a set of suffix rules, with optional dictionary words, usually providing exceptions to rules, and where a word does not match any dictionary entry, system 100 applies rules, and if no rule is found, a fallback rule, for example, a rule saying that if the last letter of the word is "a", then an activator event after the last vowel would mean that the "a" should be converted to an "à", would be applied. If the host environment such as the operating system, or application, provides no language information, a method is used to identify Italian text by comparing all bigrams (letter pairs) in the current word with a table of bigrams used in Italian. This technique occupies about 100 bytes of memory to store bigram data for all possible pairs, is fast, and for Italian provides reliable results because Italian uses only a small part of the possible two-letter combinations, about only one third of all possible combinations. The table of bigrams is stored so that each possible bigram is represented by one bit, which is set to 0 or 1 to indicate that that bigram is used in Italian, or other language to which this invention is applied, or is not. A bigram language analysis is fast and improves the reliability of accent rules on slower systems where a word-based analysis using a whole dictionary of stored words or other techniques might use too much memory and execution time.

The variable context.typemode indicates whether, during interactive text input mode, text is being inserted, i.e., text to the right of the current cursor position moves to the right as new text is entered, or overwritten, i.e., new characters replace existing characters. This information is used both to appropriately update the local context buffer, and when sending fake input characters to replace one string with a new one. For example, in insert mode, to replace a character with another one the user, or a system simulating user input, presses the Backspace key followed by the new character. In overstrike mode, however, the user uses the Cursor Left key instead of Backspace, or otherwise one character of unrelated text following the replacement point is lost. Alternatively, the user, or system 100 simulating user input, temporarily changes the TypeMode as appropriate before text input, and then restores the original status. The TypeMode is typically changed with an appropriate application or system command. Under MICROSOFT WINDOWS and other operating systems running on PCs the TypeMode is changed using a dedicated keyboard key, named Insert. Use of this key is intercepted or simulated as necessary. Applications typically initiate in insert mode, with a few exceptions starting in overstrike mode, such as the MICROSOFT WINDOWS Command Prompt window, which are known, and/or which the user may want to program with appropriate settings, and system 100 described here must keep track of all actions which affect the TypeMode status. A few applications use the Insert key for other purposes, for example MICROSOFT WORD can use it to insert clipboard text, but these same applications usually provide an interface with TypeMode status information. On other systems and applications, equivalent keys and commands are detected and simulated as necessary.

Activator Event Sequences

An appropriate activator event character for Italian is the apostrophe. The function of system 100 described herein lies in the algorithms employed to ensure that the apostrophe character is properly converted to an accent, or left as is, or recognized as an error and therefore totally removed from the input stream. The acute character, the character under the tilde character on US keyboards, may be utilized instead of the apostrophe, or to explicitly set one type of mark instead of the default one placed by the apostrophe sign.

For one embodiment of the invention applied to Italian, accented vowel characters that are present in the input stream are processed as if they were two separate characters, namely, the vowel character plus the activator event expressing an intention to select an appropriate character, different from an exact character. This is equivalent to an occurrence of the vowel character followed by an apostrophe character, with the exception that the considerations dealing with possible single quote character ambiguities, for example a closing quote character, do not need to be applied. It is effective to treat accented vowels appearing in the text stream using an interactive mode, for example when the user is typing, and only if such accented vowels appear at the end of words, and optionally unless they are not preceded by an apostrophe, when working on file or clipboard data. Accented vowels appearing in the middle of words are usually not Italian, and are written by more sophisticated writers who intentionally utilize such characters, and an interactive mode provides additional control to correct or change the proposed accent or apostrophe. In other words, in an interactive mode it is fine to take action one letter after the other, as they are typed, and the concept of "inside" a word does not exist, because during normal typing of a word letters are always at the end of the partial word. System 100 described herein provides an intuitive way of looping from one character to the other. On file and clipboard data, system 100 determines when something occurs at a true end of a word, and there is no option for user interaction, so changes in the middle of a word are normally not applied, unless specific user settings or dictionary entries require such a change, or at least not based on generic suffix rules alone. Thus, in one embodiment of the invention, accented characters appearing at the end of a word but before an apostrophe are left unchanged.

Certain characters ("\", "/", "|", apostrophe, acute, etc.) are optionally utilized by system 100 to explicitly express what type of accent or apostrophe is placed. This provides one way to handle exceptions. It may not be utilized by an average writer, and in an alternative embodiment the dictionary is extended, rather than to using such a method when typing. This method is useful to handle exceptions when encoding accented text as 7-bit ASCII, for future re-conversion.

Repeatedly pressing an activator event during text input toggles the state of different diacritical signs, such as acute, grave, circumflex, apostrophe, umlaut, no sign, etc. This set of signs, as well as the desired order, is based on language, user settings and optionally are dynamically adapted based on the frequency of previous selections. In other languages (non-Italian), or for language-neutral applications, such as for entering currency or other symbols that are not present on a keyboard, this embodiment is used in combination with certain predetermined sequences of characters that normally do not occur in normal text. For example, currency symbols are usually never used more than once in a row, so the repeated pressing of a currency character, e.g., "$", could be recognized and processed as an activator event by system 100, initiating a certain action. In many languages, action is initiated after a certain character is pressed two or three times, or when this is done one, two or three times after a certain context, for example, in German, repeating "e" after an existing "ae", "oe" or "ue" initiates a loop toggling between the two letter pair and the first letter with an umlaut.

Automatic Changes and User Re-corrections or Further Modifications

When system 100 is utilized in an interactive mode, for example during typing, a loop providing multiple options is initiated it following an automatic change. Also loop is initiated to more simply override the automatic change and to manually enter some text. The user additionally has other manual ways to input sequences which would normally be changed by system 100, such as certain combinations of characters which might otherwise initiate an IME loop that does not include those combinations of characters. This includes using traditional text editing sequences to input one character at a time, separated by a space character, and then removing the space character. Even after very short use of this system the user becomes familiar and comfortable with the fact that certain actions result in automatic changes and loops, and because these automatic actions are very predictable, the ways to avoid them, if necessary, also come very natural to the writer.

Rules and Data Structures Used for Italian Text Input

When system 100 is utilized with Italian, in which case the considerations using apostrophe and accent characters apply, reliability is provided when automatically producing a correct output on a first try, without requiring additional user feedback or efforts. System 100 automatically places an appropriate accent or apostrophe mark at the end of words, which in general means on or after a vowel. For one particular embodiment, it is sufficient to utilize a set of word suffix pattern matching rules, with appropriate priorities, and default fallback cases. Specific words may be included in the rules, mainly to define rules and exceptions that are associated to certain exact words, rather than to groups of words ending with a certain suffix.

In certain cases a word is written in a particular way rather than being based upon an assumption for a sequence of suffix rules, for example to produce a positive match on a foreign word, or one that had not been considered as an exception. Such as case is, for example, when the user is writing inside a single-quote context. In such a case, system 100 considers that an apostrophe character after a word which in the dictionary explicitly appears is written with a certain accent or apostrophe is not a closing quote, but rather should be transformed into an accent, whereas if instead the word does not produce an exact match, but rather only satisfies the suffix rules, then system 100 displays an information box and optionally produces an audio cue, while producing a default output. The default output in such uncertain conditions, for example where there could be a closing single quote, or an accented unknown word, is based on statistical considerations about the likelihood of a closing quote at a certain distance, for example measured in characters, or words, from an opening quote, as opposed to the statistical likelihood of an accent sign on an unknown given word. This information, together with accents on words that match suffix rules, but not exact word entries, are collected and remembered by system 100 by being stored, so that user choices progressively converge so that system 100 produces better results on a first try.

In an alternative embodiment, an exhaustive dictionary of words, in addition to suffix rules, in an editorial context is provided. A professional publishing house might have a policy to check every single word. In such an embodiment, even when the suffix rules produce the correct output, a warning is issued informing the user that a word is unknown, as is done for unknown words in general, based on a traditional error detection approach. System described is applied independently from traditional spelling checkers and similar technologies, in comparison, requires less manual intervention, and is more reliable.

The data structure presented herein can be used for all of these purposes, integrating a varying number of suffix rules and exact word entries, based on accuracy, speed and memory overhead priorities. Even where system 100 utilizes only a few dozen suffix rules and exception words, a first hit reliability exceeding 99% for the average Italian writing needs is provided in one particular embodiment.

The context.language status variable is used to determine whether to apply Italian rules to the text, or not. This particular embodiment of system 100 employs two additional techniques to prevent possible errors. First is a bigram table is used so that Italian suffix rules are not applied to words that contain one or more bigrams that do not normally occur in Italian words. Second, a list of certain word patterns is provided for words which in English, often used in an Italian context, are associated to an apostrophe sign, and which do not occur in Italian. English words ending with a vowel and which are more frequently followed by an apostrophe (e.g., "I", "he", "she"), and which do not have an Italian accented equivalent, are listed together with other Italian words, but with appropriate flags indicating that these words are not normally accented, i.e., system 100 does not convert an apostrophe after these words to an accent, which is a default action for Italian, unless a word is known to occur with a final apostrophe. Additionally, system 100 includes a special list of words, rules with a POSTAPOSTROPHE flag, which are known to only exist after an apostrophe, and which are used in English, such as: "s" (also used in German), "d", "ll", "ve" and "em". When the user writes a word, ending in a vowel and followed by an apostrophe, and the Italian rules, possibly a suffix or fallback rule, cause the word to be accented by system 100, and then these known "post-apostrophe" words occur, and then the word ends, system 100 restores the previously changed apostrophe. For example, considering "I'll go home", system 100 recognizes "I" as a word which can be either without accent in Italian or followed by an apostrophe in English, but never accented, not even in Italian, and leaves the apostrophe as is. Had the entry for the word "i" not indicated that the word does not exist with an accent, system 100 is still able to retroactively correct a change from apostrophe to accent after checking the "ll" word, as is done for the case below.

Considering "Gina's car is red", system 100 may initially convert "Gina'" to "Ginà", assuming that no exact entry for "Gina" exists indicating that the accented "Ginà" does not exist, therefore applying a generic suffix or fallback rule, but then, after the following non-word character, system 100 recognizes the apostrophe+"s" pattern, and restores the apostrophe.

In one particular embodiment, the data structures for Italian consist of a series of lists which all deal, in one way or another, with apostrophe and accent information. The lists consist of five sorted lists ("A", "E", "I", "O", "U"), each containing rules for word and word suffixes ending with the corresponding vowel. Each entry can refer either to a word suffix, that is to a group of words ending with the same suffix, or to an exact word, and can have one or more flags. One optional list of words ending with a consonant is provided, but which are nevertheless frequently written followed with an apostrophe even if no apostrophe should be placed after the word. For example, the list contains an entry indicating that the word "qual" is never to be followed by an apostrophe. In this case, as explained in the general overview, system 100 replaces the apostrophe with a space character. These entries usually only have the NOTHING flag. One list of replacement rules is also provided. These can optionally be enabled to place accents inside certain foreign words. For example, a rule could say that if the user writes "Cezanne", the word is automatically converted to "Cézanne". These rules, like the rules for words ending in a consonant, complete system 100 in an optional way in that they can be optionally provided, and do not affect the main feature of input method editor functionality. One optional list of words includes that are known to occur after other words separated only by an apostrophe character is optionally provided. These entries include mostly particles, such as "s" for English and German possessive forms, "d", "ll", "ve", etc. This list enables system 100 to posthumously recover from certain incorrect changes that might have been applied as a result of suffix and fallback rules included in the five vowel lists. As a result of this list, system 100 becomes more reliable even when writing for example in English, and when language detection is not possible.

Word and suffix entries in the lists are case, accent and apostrophe insensitive, that is the entries produce matches ignoring accent, apostrophe and case information. This is also referred to as normalized. The entries only consist of the letters "a" to "z", and the dash symbol ("-"), if surrounded by other characters. One asterisk character is used, at the beginning of an entry, to indicate that the entry refers to a word suffix, and not an exact word (e.g., "*che" vs. "perche").

The following flags and attributes are optionally associated, also in combinations, to the entries:

NOTHING: this flag indicates that the word, possibly also, exists without a final accent or a final apostrophe sign.

GRAVE: the word, possibly also, exists with a final grave accent

ACUTE: the word, possibly also, exists with a final acute accent

CIRCUMFLEX: the word, possibly also, exists with a final circumflex accent

APOSTROPHE: the word, possibly also, exists with a final apostrophe immediately following the last letter APOSTROPHERARE: used with APOSTROPHE, meaning that use of the word with apostrophe is very rare. The user may decide to set system 100 in a way that the word is not considered to have APOSTROPHE if APOSTROPHERARE is set, which would improve the automatic detection of certain common apostrophe and accent errors.

INFORMATION=string: This is an information text that may be displayed as a tool tip above the cursor position, or elsewhere on the screen. It could say something like: "This word is used with or without accent. Without accent it means XYZ. With accent it means ABC." Usually the tool tip is displayed to inform the user that an entry with accent or apostrophe is probably not what was meant, i.e., not necessarily an error, but more likely to be one than not. In the program settings, the user can decide to display different types of messages.

COMPOUNDSTRICKY: This flag, used with words that have no accents, indicates that compounds of that word do have an accent. This is a confusing condition for the writer, and this flag allows for a more detailed explanation to the user, depending on the desired level of information messages. For example, if the user wrote "tre" with an accent, system 100 removes the accent and displays a message saying that "Unlike its compounds, 'tre' is written without accent".

TRICKYCOMPOUND=string: This string attribute indicates the COMPOUNDSTRICKY word of which an entry is a compound, for the purpose of displaying complete information to the user, if desired.

ITALIANIZED <LANGUAGECODE>=string: This attribute and additional string fields indicate that the word is an "Italianized" version of the word, which in the original language is written differently. Italianization of words is not as frequent today as it used to be, and often resulted in accented words. In modern writing the original words, English, French, etc., tend to be more desirable than the old Italianized forms. Appropriate program settings are, for example, used for automatic replacement with the desired word variant to consistently use the Italianized or the original forms. String attributes complete the information by indicating the original word, specifying the original language.

CAPITAL: This attribute indicates that the word to which the rule refers always appears with a capital letter. This information is useful to detect certain proper nouns for which specific accent rules apply.

TRADEMARK: This attribute indicates that the word is a trademark or registered trademark. This information is displayed to the user as part of a view of all the word properties. For example, the entry for the company name "Océ" would be "Oce ACUTE CAPITAL TRADEMARK".

WEEKDAY: This flag indicates that the word is the name of a weekday. Weekday names from Monday to Friday are accented in Italian, and represent one of the more frequent instances of errors in which an accent is not written, when instead it should be. This flag, in combination with an appropriate program option, could be used for automatic correction of weekday names written without an accent.

TRICKYINSIDE: This flag indicates that the word contains accents, but not at the end of the word. This flag is normally only used for non-Italian words, typically French words sometimes used in an Italian context. Like WEEKDAY, this flag allows the program to reduce the computational overhead by limiting the search of words in a non-end-of-word-accent context to the words that may require attention even if written without a final sign.

COMPLEX=string: This string attribute is used to describe the accents in a usually non-Italian word when the attributes for final accents (GRAVE, ACUTE, CIRCUMFLEX) are not sufficient, i.e., because the word contains diacritical marks inside the word, and/or at the end of the word, but not of type GRAVE, ACUTE or CIRCUMFLEX.

FALLBACK: This flag marks the last rule in the first part of the list. A fallback rule is of type "*a", "*e", "*i", "*o", "*u", i.e., it is used only in the lists associated to words ending with the five vowels, and indicates the fallback rule to apply when the previous rules, which are parsed sequentially from top to bottom, produced no match. This flag has no functional purpose other than to mark the boundary between the two parts of the list, as explained below.

POSTAPOSTROPHE: this attribute, used in a dedicated list, marks those particles such as the English "s" and "ll", which are written after an apostrophe. These particles are used to correct signs incorrectly changed to an accent, which is a condition that occurs when applying Italian rules to non-Italian words, as is the case with words that usually precede such particles. At the same time, these particles represent, in many languages, the only cases in which apostrophes are used at all. Recognizing these occurrences increases the reliability of system 100 when applied to a multilingual context.

NOTITALIAN: this attribute is used to allow certain word entries in the rules lists to be recognized as not being Italian words, so that they can be considered even if the current language context is not Italian, which would normally disable system 100. This allows, for example, placing the correct accent on non-Italian words such as the noun. "José", which might normally fail even a simple Italian bigrams test. Use of this flag is optional, and also depends on the advantages it brings with consideration to the procedure used for language detection, if any.

Flags are optionally combined, if more than one flag applies to the same suffix or word. For example, a word may exist, with different meanings, with no sign, with an apostrophe, and with an accent. Such a condition is rare, but exists. Great care is placed in compiling the list of rules that are part of the lists, because if a word or suffix rule becomes part of the list, since in one embodiment system 100 considers all words for which there might be a match, not just some words. In one particular embodiment, entries with no flags have no meaning, and are not permitted.

For the purpose of determining whether the input of a universal activator event in an Italian context refers to an apostrophe, an accent, or an error, in one embodiment system 100 places a higher priority on the collection of data about words and suffixes that are often incorrectly written with a sign, and those that are written with an apostrophe. These two cases, which are covered through word rules rather than suffix rules, are excluded in an exhaustive way before focusing on accents, since accents use more suffix rules, including fallback suffix rules.

In one particular embodiment the lists are parsed sequentially, top-to-bottom. System 100 is optionally modified to reduce the number of comparisons, using a variety of possible data structures for sorting and searching, which are well known. When system 100 determines a positive match between the current word and a rule, the search is ended unless a second search is necessary in the second part of the lists.

Rules that represent exceptions to other rules appear higher in the list than the rules of which they are an exception. Rules are also placed higher on the list based on frequency considerations. The 20 most frequently-used rules cover more than 90% of Italian accents, which facilitates using a simple sorted list. In a sorted list, careful placement of the rules based on frequency is one factor that improves performance. In on embodiment, rules are preceded by their exceptions. For example, a rule indicating that "*che", i.e., words ending with "che", can have either an acute accent or no accent or apostrophe, are preceded by exception entries for words such as "picche", which can be written either without any sign or with a grave accent. If a "*che" rule is placed on top of the list for frequency or access speed reasons, then all of its exceptions are placed before it as well.

Each of the five "vowel lists" contains a fallback suffix rule entry (SUFFIX flag), being the shortest possible suffix rule, i.e., the one vowel to which the list itself refers (e.g., "*a", "*e", etc.), and following all other rules, although additional entries may follow in a second part of the list. This entry is also marked with the FALLBACK flag, although it could, in theory, be implicitly identified by the fact that it is a one-character SUFFIX rule. For words ending with a vowel, a fallback rule indicates the statistically best fallback description for words ending with each vowel when none of the previous rules matched. A fallback rule typically indicates that words ending with that vowel either have no sign, or they have a certain type of accent. For example, the fallback rule for words ending with E indicates that those words, unless covered by rules appearing higher in the list, have either no sign, or they have an acute accent. If for example the user writes an unknown word ending with "e", and followed by an apostrophe, system 100 transforms the vowel+apostrophe combination into the vowel with an acute accent ("é"), rather than leaving the apostrophe, because the fallback rule had no APOSTROPHE flag. For this reason complete rules are provided that cover words ending with E that are written with an apostrophe, or that end with a grave accent, or that are often written with a sign even if they should not, as well as additional safeguards to recognize apostrophes that may in fact be closing single quotes, or English or German possessives, or similar particles used in combination with an apostrophe sign.

In one particular embodiment of the invention, when a rule entry contains the flag NOTHING and no other flag of type GRAVE, ACUTE, CIRCUMFLEX or APOSTROPHE, and the input contains an accent on the last character of the word, or an apostrophe after the last character, then system 100 removes that sign. If however the sign was a sign used as a single closing quote, and the context is such that a single closing quote is indeed expected, then the sign is not removed. Also, if after the removal of a sign equal or similar to an apostrophe, a POSTAPOSTROPHE word string follows, as soon as this second word string is complete (i.e., after the first non-word character following the string), then system 100 retroactively re-corrects (i.e., further modifies a corrected word including undoing a correction) the previous correction, reinserting the apostrophe. A peculiarity of writing truncated Italian words ending with an apostrophe is that if the last character of the truncated word is a consonant, then the apostrophe also acts as a spacing character between that word and the following one, i.e., no space character is used between the two words. System 100 automatically removes an incorrect apostrophe sign by taking this into consideration, in order to place an appropriate space character where necessary. As described elsewhere, system 100 provides for different ways to override the automatic removal or change of a sign, for by manual editing or by a repeating input initiating an IME loop.

A rule entry containing only one flag of type GRAVE, ACUTE, CIRCUMFLEX or APOSTROPHE expresses a very clear statement about matching words, indicating that any matching word is not written without sign, but only with a sign, and also indicating the exact sign. This not only eliminates ambiguities in a context such as that where a closing single quote is expected, and the user pressed the apostrophe key, but it is also used to place missing signs when the text input stream did not contain any special signs. This may be implemented as an alternative embodiment. Such an embodiment is optionally enabled for a selection of words commonly written without signs even when they actually need one, such as weekdays. In general, the single flag is used to apply the correct sign on or after a word if a sign was also present in the input text.

When a rule entry contains multiple flags, of which one is of type NOTHING, and only one other flag is of type GRAVE, ACUTE, CIRCUMFLEX or APOSTROPHE, then system 100 places the appropriate sign, if an apostrophe or similar character follows the word, or if an accent is on the last vowel of the word. Optionally, system 100 is programmed to leave accented vowels, for example in interactive mode, the result of an explicit selection of an accented key opposed to the selection of the apostrophe, as they are, and only apply rules logic to the output when apostrophe characters, or some other specific activator event, appears in the input. Also, as already mentioned, system 100 is optionally set not to apply any changes when accented characters are found inside, not at the end of, words. This condition is detected when working on clipboard or file data, and during typing where action is deferred to when the end of the word has been reached.

Word or suffix entries with more than one of the GRAVE, ACUTE, CIRCUMFLEX or APOSTROPHE flags are rare in Italian, and usually consist of either GRAVE or ACUTE and APOSTROPHE+APOSTROPHERARE. The default setting in one embodiment is to ignore APOSTROPHE+APOSTROPHERARE flags, resulting in simpler entries consisting of NOTHING and/or GRAVE or ACUTE. Optionally, a few entries may remain with more than one of the GRAVE, ACUTE, CIRCUMFLEX or APOSTROPHE flags, which may also be combined with the NOTHING flag. In these cases, system 100 may not automatically make changes to the input stream, but instead uses the flags to display an information or warning message in case the input does not match any of the flags, or to place certain signs before others in the desired order for the IME loop. Statistical analysis of Italian texts has shown that the only cases in which multiple flags appear are entries having the form: (with or without NOTHING)+(usually GRAVE, but sometimes ACUTE)+(APOSTROPHE, sometimes combined with APOSTROPHERARE), and that the entry may be left unmodified if the input contained no accent or apostrophe, and to accept an apostrophe in the input as the correct accent, which is statistically considerably more frequent than the apostrophe, even if APOSTROPHERARE is not present. The following is a sample entry of such a multiple-flag word, which also includes an information message that system 100 could optionally display:

di NOTHING GRAVE APOSTROPHE INFORMATION="di=preposition (as in "di più"); dì=day; di'=you say (imperative)"

In one embodiment of the invention, a POSTAPOSTROPHE condition overrides a previous automatic conversion of an apostrophe to an accent, or the removal of an apostrophe, even as part of an IME loop, for example with a user trying to write "José's car is red". This is because a POSTAPOSTROPHE condition typcially indicates a non-Italian context, in which an Italian word or suffix rule was applied inadvertently, or in which an IME loop was initiated inadvertently.

It should be noted how the inclusion in the rules of English words such as "I", "she", "he", "we", as well as proper nouns, all with the NOTHING flag, as long as these words are not accented even in their possible Italian word equivalents, combined with POSTAPOSTROPHE entries, creates a double-barrier against possible misinterpretations and incorrect changes of apostrophe characters used in a "non-Italian fashion", as in "I'll go home". The additional word entries are useful because the POSTAPOSTROPHE entries cause a re-correction or further modification after the user may already have been slightly confused by a temporary incorrect change. The additional entries help to prevent these cases, which are typically rare in Italian.

Optionally, the lists of rules associated to words ending with a vowel may have a second part of entries, after the fallback rule. In this embodiment, the second set of entries does not change the results that would be achieved by applying the first set. An entry in the second part conflicting with the rules appearing in the first part, including the fallback suffix rule, is considered an error in the data structure. While the first part of the list has a priority on performance, achieved using suffix rules, the second part additionally specifies words, and in rare cases suffixes, that are already covered by suffix rules in the first part, but which in the second part are listed in detail. Such information is used to produce more accurate results in a context where single quotes are used, or in a more professional editorial context where unknown words should not be processed applying a generic suffix rule, but rather be double-checked manually, as well as to provide additional information to the user about an automatic change. When a word, not a suffix, rule appears in the first part of the list, that word is considered a positive confirmation that the word exists in Italian, and that it is written as indicated by the attributes for that rule. When a suffix rule appears in the first part of the list, then that is treated as a generic rule, and not as exhaustive information. Thus, the NOTHING flag is used on suffix rules that appear in the first part of the list. For example, a suffix rule describing words ending with "che" has both flags for NOTHING, and for ACUTE. If the user wrote "affinche'", system 100 correctly outputs "affinché". However, if the user wrote "affinche'" in a context were a pending closing single quote was detected, system 100 determines whether it would be best to treat the apostrophe as a closing single quote, or rather as an accent. Different fallback behaviors are defined for these conditions, including the display of a warning message, and access to statistical data about the likelihood of a closing quote at a certain distance from the opening quote, in addition to or in lieu of the frequency of an accent on an unknown word. If the second and longer second part of the list, which is accessed in these more ambiguous cases, included an entry for "affinche" having only the ACUTE flag, then system 100 determines that the word "affinche'" exists, and that the word is always written with an accent, and therefore the apostrophe character was intended as an accent for "affinché". The input of a second apostrophe character, should one follow, is interpreted as a closing quote.

The second part of the list defines in detail, with separate word entries, what should already be included by suffix rules in the first part, but which these suffix rules do not completely describe and at the same time limit in an exhaustive and complete way. In addition to the cases described above such as single quote context, editorial context, another possible application of the entries in the second part is changing the color of a status indicator from one color indicating that a suffix rule is applied, for example yellow, to a different color for example green when an exact word match was found. Also, whereas suffix rules are more open, generally including the NOTHING flag to consider for possible unaccented words matching that rule, exact word entries need not do the same unless an exact word can be written both with and without accent, making it possible to automatically add accents and apostrophe characters even if the user placed no sign. Except for very specific cases, such as weekdays and a few other common mistakes, such automatic behavior is not be utilized in one particular embodiment, for example because Italian still has many words that can be written either with or without a sign, which is not particularly conducive to safe automatic action, although automatic action can still be optionally utilized.

To further clarify, where system 100 includes vowel-lists divided in two parts, the first part is designed in such a way that correct output is generated when the user enters, for example, the apostrophe key after a word. The second part of the list provides additional certainty, which is normally not required. The flags for the exact word entries in the second part of the list match or are a subset of the flags for the matching suffix rule in the first part.

In rare cases it is possible to also use suffix rules as opposed to word rules in the second part of the list. If they are used, then the entries are treated as being as "authoritative" as exact word entries. One case in which a suffix rule may be used in the second part of the list, for example, is for suffixes such as "ventitre", which means "twenty-three", and which can be appended to an unlimited combination of other numbers. However, the suffix rule "*ventitre" has a string which makes it detailed and precise enough so as to be particularly applicable to words meaning numbers. It can safely be used without the NOTHING flag, to mean that all words ending with "ventitre" are accented.

Word entries have the same meaning and are treated the same way both in the first and the second part of a list, and do not need to be repeated twice. Suffix rules are authoritative meaning that they give sufficient certainty about most or all matching words even in certain unusual circumstances such as single quote contexts. Word entries in the second part of the list generally do not conflict with suffix entries in the first part where they have either the same flags or a subset thereof.

Depending on the implementation, it is possible to optionally not include entries for the type of rules described as belonging to the second part. Conversely, on a sufficiently fast system, or using different data structures, the two lists are capable of being merged into a single list. Separation of the lists maintains the first list as short as possible, yet where called for in exceptional cases, additional and more exhaustive data in the second list may be accessed.

Sample Implementation: Processing of Italian Text Input

In one embodiment of system 100, system 100 is optimized for Italian writing. In one particular embodiment, system 100 is interfaced with a MICROSOFT WINDOWS operating system 126, available from MICROSOFT CORPORATION, as an input hook wherein system 100 has access to keyboard 112 and mouse events as they occur, and further provides the ability to simulate keyboard input independent of user actuated keyboard input. For example, in a particular embodiment, where application 130 currently processing input is MICROSOFT WORD, then system 100 uses specific functions, documented by MICROSOFT, to get current context and language information from MICROSOFT WORD. Similar interfaces could be used for other programs and for other operating system such as LINUX available from multiple sources including RED HAT, INC., MAC X available from APPLE COMPUTER, INC., etc. where available. If application 130 is not MICROSOFT WORD, or another application providing access to information such as text context and language, then interfaces of operating system 126 such as those provided by MICROSOFT WINDOWS are used to collect text context, language and current cursor position information. For example, the interface specifications for MICROSOFT WINDOWS include: Active Accessibility and Input Method Editor (IME). Such operating system-wide interfaces only give meaningful results when the user is writing using an application that provides such data to the operating system, which in turn can then pass it to an application such as system 100. For example, in order to use IME functionality, the application used for writing must be IME-aware. Where the application supports no interface to provide text context and language data, system 100 described here can still obtain current word context from the local copy of the context, which is determined from the keyboard input stream, but which may be lost in cases such as vertical cursor movement, use of the mouse to move the cursor, or selection of a command, either via the menu or via a a Keyboard Accelerator combination of keys. To reconstruct context in this case, it is still possible to use system 100 functions to try and determine at least the text cursor, also called caret, a blinking line, block, or bitmap in the client area of a window. The caret typically indicates the place at which text or graphics will be inserted. If it is not possible to determine the cursor position through system functions, system 100 analyzes the display memory to detect a small flashing object. Once the cursor position has been determined, in the case of a bitmapped display, system 100 applies optical character recognition (OCR) algorithms 122 to the bitmap contents, with particular focus on the letters to the left of the cursor. OCR 122 is particularly effective on screen bitmaps, because the character data is both clean i.e., not rotated or disturbed by printing or medium imperfections, and because system functions are used to determine the fonts that are currently in use thereby facilitating the OCR process. Since the possible fonts are known, the font possibilities are limited to a particular list. If the display is not bitmap-based, but character-based, then system 100 extracts text directly from display memory. In most embodiments, text context is not required to be determined immediately after it is lost following a cursor relocation. Even where context information is desirable, for example where the user moves the cursor and immediately afterwards presses the apostrophe key to edit an Italian word, OCR 122 or other context analysis routines only need to succeed in obtaining the current word. Even where only a few characters before the current cursors can be obtained, this is sufficient to apply Italian rules, which in most cases are suffix-based. The ending of words is determinant of accent information, which is where system 100 typically works. For example, in Italian the whole accent and apostrophe issue is typically primarily determined by the suffix of the word. Additionally, because of the statistically unlikely chain of events required to occur in order to result in a possible failure, system 100 functions reliably even when context is temporarily lost as part of normal writing use. On-screen OCR is most likely to succeed on the characters that are determinative, i.e., the current word or at least a part containing the relevant suffix of the current word, because these parts are most likely to be visible immediately before the cursor position, rather than being located on a different line, or covered by another window. OCR analysis is optionally closely coupled with an Italian rules parser which stops the analyzing of text right-to-left in the event a positive suffix-rule match occurs.

If system 100 determines that the text stream needs to be modified, for example to replace a vowel and an apostrophe with an accented vowel, system adds artificially generated information to the output stream, generating characters such as a backspace key input followed by an accented character. Where application 130 or operating system 128 support this, in a particular embodiment, one string is directly replaced with another one without requiring simulation the progressive deletion of the old string. In either case, the local context buffer is also updated accordingly.

In one embodiment of the invention where Italian is addressed, the apostrophe character, and similar characters that may be present on a keyboard or character set, as well as all accented vowels, are utilized as activator event sequences since it has been determined that utilization such activator events provides a method for providing correctly accented and punctuated words in a manner that is intuitive to a writer of the Italian language. In utilizing the apostrophe character, system 100 avoids interpretation errors by system 100 without requiring a lager-sized dictionary. System 100 processes Italian end-of-word conditions such as accent, apostrophe, and no sign, using general suffix rules, which are capable of being implemented in using a limited word dictionary or even no word dictionary. Regardless of the size of the word dictionary utilized by system 100, the user may enter a new word, or may start writing in another language, or may write an Italian word that may exist both with and without a sign on or after the last vowel. In such cases, system 100 estimates the most likely intention of the user for pressing the apostrophe key. If system 100 finds no specific likely reason for the apostrophe, other than it being part of the word, then the word suffix rules are applied, otherwise the apostrophe is left as is, and is not treated as an activator event. For these reasons, in one embodiment a list of the most frequent words with an apostrophe or accent is provided, as well as words that commonly are mistakenly written with such a sign, regardless of whether system 100 has a suffix rule that already would produce an accurate result for this word. For example, a suffix rule saying that the sign normally used on words "*che", i.e., all words ending with "che", is an acute accent as in "perché", would work very well if the user wrote:

perche' at the beginning of a sentence. The word is automatically converted to:

perché

Where system 100 encountered"
'perche' system 100 determines to convert the input to:
'perché if the complete word "perché" was found in the dictionary, and the data in the dictionary made it clear that the word only existed with an acute accent. If the word was unknown, or was such that it could be written both with and without accent, usually indicating two different meanings, then system 100 leaves the apostrophe unmodified, assuming it was a closing single quote. Different default behaviors for system 100 are optionally set.

In the previous example, i.e., in a system containing an exact word entry for "perché" when the user presses the apostrophe activator event for the second time, system 100 produces:
'perché' such that system 100 recognizes both the pending closing single quote condition, and the accented word, the IME loop places the vowel+acute accent+apostrophe combination in a second position after the first press of the apostrophe, resulting in vowel+acute accent, resulting in an intuitive and efficient input sequence for this particular context.

In one embodiment of the invention, two major aspects differentiate the default behavior of system 100 when applied in an interactive context such as keyboard input, compared to a non-interactive stream such as file or clipboard data:
1. Accents inside words are not corrected in non-interactive mode;
2. Repeated activator events e.g., apostrophe characters, do not initiate IME loops in non-interactive modes.

In an alternative embodiment of system 100, three aspects differentiate the default behavior of system 100 when applied in an interactive context such as keyboard input as compared to a non-interactive stream, such as file or clipboard data:
1. Accents inside words are not corrected in non-interactive mode;
2. Repeated activator events (e.g. apostrophe characters) do not initiate IME loops in non-interactive modes;
3. Spacing characters are not automatically inserted as part of the automatic processing of accent and apostrophe characters in non-interactive mode.

The differences describe the additional control provided by interactive mode, which is typically not available when working on a non-interactive input stream, although the additional control may be optionally utilized in a non-interactive mode if desired. For example, if the present system were applied with the purpose of converting 8-bit Italian text data to 7-bit data such as a plain ASCII character set, apostrophe characters, which are part of the ASCII set, could be used in the text in place of accents, which are generally not part of the ASCII set. This results in a text with simple apostrophe characters instead of more complex control sequences, that are readable by humans, and which could be processed by system 100 for re-conversion to 8-bit data. In some instances, where during conversion to 7-bit data system 100 detects that the output of a single apostrophe character would be such that re-conversion to 8-bit data would produce a result different from the original, system 100 outputs multiple apostrophe characters, in which case functionality comparable to interactive IME loops is provided in non-interactive contexts.

System 100 provides an option to indicate whether accents should be placed on upper case letters. In one embodiment, the default for Italian is Yes. If the setting were No, as with some languages such as French and for certain editorial styles, one setting provides all upper case letters with no sign, regardless of their position in the word. In one embodiment, system 100 remove accent signs and appends an apostrophe to the end of the word if an accent was removed from the last vowel of the word. System 100 provides a similar option to indicate whether accents should be placed on a lower case letter. An application of this option is, when set to No in combination with the option to not place accents on upper case letters, to create a pure 7-bit text. System 100 also provides settings to change the apostrophe character which is appended at the end of words when an accent was removed as a result of a setting indicating not to place accents on upper or lower case letters. By default in one embodiment, the apostrophe character is used, but different characters are optionally used, for example the grave and the acute accent character, depending on whether the accent removed from the vowel at the end of the word was grave or acute.

An additional option of system 100 determines whether foreign words appearing in the word lists (ITALIANIZED flag) should be left as written, or replaced with the original non-Italian word. The default setting in one embodiment is to leave the words as written. Another option of system 100 is replacement rules for words with a COMPLEX= <string>attribute, where any matching word would be replaced with the <string>(e.g., "Cezanne" would become "Cézanne"). This option is enabled by default in one embodiment, and is helpful to properly write certain non-Italian words, usually French words used in Italian. Yet another option of system 100 determines whether end-of-word accents or apostrophe characters may be automatically added to words even if the input stream contained no sign at all. This option is disabled by default, as already explained. One possible setting is to enable this option only for weekdays (WEEKDAY flag) or for words with the TRICKYCOMPOUND attribute. Another setting enables the option for all words which have no NOTHING flag, and only one of GRAVE, ACUTE, CIRCUMFLEX or APOSTROPHE.

Another option allows the user to set the level of verboseness during interactive mode, i.e., the frequency at which tool tips are opened above the cursor to display information. The default setting in one embodiment is to display information relating to words which may be written with more than one sign, e.g., with an apostrophe, or with an accent, or with no sign, and which have different meanings depending on the sign that the user may decide to use. Tool tips are also displayed by default in one embodiment when an IME loop is in progress.

An option of system 100 allows for the normalization of the apostrophe character, i.e., if the input contains a character that is similar, but not identical, to the apostrophe character, then the input character is processed as a user-desired standard apostrophe character. For example, many keyboards contain a grave character, which is often used instead of the apostrophe, to which it is visually very similar, and possibly resulting in inconsistent use in the text. This option ensures that the text contains the same apostrophe character. An additional program option is associated to the spacing apostrophe as described herein. In one embodiment, apostrophe characters as well as similar equivalent characters are interpreted as opening single-quotes if they are immediately followed by a letter or digit, and not immediately preceded by a letter or digit. Similarly, in order to be recognized as such, closing quotes must be immediately preceded by a letter, digit or punctuation sign, and not be followed by a letter or digit. Quote characters followed by POSTAPOSTROPHE strings, or by two digits (as in "the summer of '99"), do not count as either opening or closing quotes. Other techniques to recognize opening and closing quotes are utilized, for example simply requiring a single opening quote character to be preceded by a space, new line or beginning of text, and treating every other quote as a closing quote. All of these techniques are optionally used. Double single opening and closing quotes are recognized in a similar way. For certain languages, it may be necessary to treat single or double-comma characters, immediately followed by a letter or digit, and not immediately preceded by a letter or digit, as if they were quote characters used as opening quotes as in "This is an „example" used in German". After a single or double opening quote has been identified, system 100 sets a corresponding flag that is cleared only after a corresponding closing single or double quote. In order to avoid leaving the flag set by mistake, e.g., after a single quote that had incorrectly been identified as an opening quote, the flag is cleared after a certain number of characters, words or sentences. Optionally, system 100 contains a table indicating, for varying character, word or sentence distances from an opening single or double-single quote recognized with a certain technique, the statistical likelihood, based on previously analyzed real-text data, that a closing item appear in that relative position. For example, after 100 characters from an opening quote, the likelihood that the following character is a closing quote may be determined to be 1.31%. If necessary, this data is compared with a threshold below which the single quote mode flag is cleared, or the data is compared with statistical data about the likelihood of an apostrophe character after an unknown word being an apostrophe or accent, or being unrelated to the word. In certain environments, such as for example those requiring higher editorial standards, various contexts in which single quotes are encountered could be flagged as warnings for user inspection without relying on automatic processing.

Optionally, system 100 issues a warning whenever the single quote mode flag is automatically cleared because the distance from the opening quote is determined to be excessive, or because the end of the text is reached. Also, a warning is issued if an opening single quote is encountered within a context, which already is in single quote mode. If a quote-depth-counter is used instead of a simple flag, a warning is issued if, at the end of a document, or after a certain distance from the last opening quote, the numbers of opening and closing quotes do not match.

Interactive Mode: Desired IME Loops for Italian

The action wherein system 100, based on a sequence of input events, produces different text outputs, one replacing the other, is herein referred to as an Input Method Editor (IME) loop. The contents and arrangement of the possible outputs, through which system 100 loops, can change depending on the application, for example writing of Italian or another language, or the input of currency symbols, etc., user settings, and data collected during previous IME loops. For Italian, in one embodiment the purpose of the default IME loops is to allow the user to cycle through all the possible accent and apostrophe combinations. This includes all possible accents, the apostrophe, and the letter without sign. The user is also allowed to write an accented letter followed by an apostrophe or single quote. For this reason this combination of characters is also optionally part of the IME loop. Different variants are possible: the IME loop for each vowel for example in one embodiment includes all combinations of accents followed by an apostrophe, or the correct accent as determined by the rules, followed by the apostrophe. In one embodiment, balancing these two considerations, the IME loop contains the second case because it is less likely that the user writes a word on which system 100 would place an incorrect accent, and that the same word also is followed by a single quote or apostrophe. Even such an unusual input can be processed by system 100. Typically, in one embodiment IME loops are used in interactive mode i.e., during keyboard input, rather than in file and clipboard operations.

In general, in one embodiment an TIME loop for Italian is initiated and used with the same keyboard key that also serves as an activator event for the automatic placement of the correct sign at the end of Italian words. In one embodiment the activator event is the apostrophe key, or the grave key, or any accented letter key. When an apostrophe or grave key is pressed once after a letter, or when an accented vowel key is pressed, system 100 parses through the rules and outputs the character or character combination determined to be correct, for example a letter with no sign, a letter followed by an apostrophe, or a vowel with an accent, or a letter followed by a space. Thus, the first output is likely and nominally a more correct output. The IME loop allows for a different output selectable by the user in an intuitive manner, which in one embodiment occurs by pressing or actuation of the activator event, accented vowel, or apostrophe, or acute, again and in succession. In one embodiment, settings and implementation options limit both the possible key or keys that are recognized as activator events, for example to use accented letters for manual input, and the apostrophe for automatic input, as well the keys that can activate an IME loop, if at all.

An additional option provided by system 100 determines the behavior when different activator events are enabled, and when such different keys are pressed one after the other. For example, when the user enters the following 8 keys:
    P-e-r-c-h-è-é-'
the above can be considered an IME loop, equivalent with:
    P-e-r-c-h-e-'-'-'
and
    P-e-r-c-h-é-é-é
In one embodiment, a default implementation for the input of Italian text, an IME loop is only initiated when the same key is pressed more than once, providing a more rigid and predictable system for the user, leaving out the different sequences for the manual handling of exceptions. Different options of system 100 may account for different behaviors if desired. Also, if the above first example is set not to initiate an IME loop, each of the last three characters can be considered an activator event, causing system 100 to apply its usual rules to each character. In one embodiment, this is the case. In one particular embodiment, if the activator event is an apostrophe, the previous context letter is considered as if it were written without any accents, i.e., the apostrophe when pressed for the first time causes the correct sign, accent or apostrophe or space character or no sign, to be placed by system 100. This also applies to the case in which the user moves the cursor immediately after an existing word in a document, rather than writing the word or part thereof, and then presses the apostrophe key or the acute key depending on what activator event is enabled. Thus, in one embodiment if the user moves the cursor immediately after a word that already has the correct accent on the last letter, and presses the apostrophe key, then to the user that input has no effect, other than confirming that the existing text is already correct. Successive, repeated input of the same apostrophe key would initiate an IME loop. A different implementation or option allows the IME loop to work in such a way that when the user writes multiple but different activator events one after the other, these all contribute to the activation of the same IME loop.

Another implementation or program option could affect system 100 behavior in such a way that if the apostrophe or acute character, or any other character considered similar, is pressed after an accented letter, then that letter is not considered without accent, as in one embodiment, but rather, an IME loop is immediately initiated, causing the apostrophe to change the accent to the next step in the IME loop, rather than starting from the rule placing the correct sign.

In one embodiment the rule for the user is predictable, for example the first press of an activator event results in a correct sign. In a particular embodiment, the second press, which initiates the IME loop, produces a character that is always the same, and in an alternative embodiment where a single closing quote is expected it places the accent followed by the apostrophe in the immediately next position of the loop. Also, if the user repeatedly, or even just once, used the IME loop functionality to change a sign after a certain word, in one embodiment system 100 remembers this and automatically adds an appropriate entry to its rules, or alternatively displays a message, either instantly or when the user asks to view a list of words that were manually changed, proposing to do so such that that when the user again writes the same word, the chosen sign is produced as a first result. Also, the order in which different accented characters appear in the IME loop is optionally the same for each letter, and alternatively the flags that indicate the possible accents or apostrophe combinations for that word are considered in order to place the known possibilities for that word first in the list. All of these variants are optionally implemented by system 100.

In one embodiment, the IME loop begins after an activator event is pressed for the second time in a row. A first time, system 100 considers its rules to place the correct sign. The second and following times, other characters are produced, and when all the steps of the cycle have been exhausted, the loop begins again as if the key were pressed for the first time. When the key is pressed for the second time, a tool tip or small information window appears over the cursor position, with a message such as "Press again for: <choice 1>, <choice 2>, . . . <choice n>", indicating the order in which the following characters would appear, with the next IME step due appearing first. For example, after the user writes "perché" using the apostrophe after the "e" to produce the last accented letter, and then presses the apostrophe for a second time, the word is changed to "perchè", and the tool tip says "Press again for: ê é' e' é è". If the user chooses to display the tool tips, and not only in cases such as when the IME loop was actually used as a result of repeated pressing of the activator event, then the tool tip would have been displayed immediately at the first press of the apostrophe key after "perche", which resulted in "perché"): "Press again for: è ê é' e' é".

Different possibilities exist for the exact implementation of the IME sequence. In one embodiment, predictability is optimized by considering that a sequence applied to vowels results in a predetermined order: the vowel with a grave accent, an acute accent, a circumflex accent, an initial correct accent followed by an apostrophe intended as a possible closing quote, and a vowel without accent followed by an apostrophe. For words that are known to exist with a final apostrophe indicated with the APOSTROPHE flag in the rules, after the grave, acute and circumflex steps, the IME loop additionally includes the vowel followed by two apostrophe characters, one as part of the word, and one as a possible closing quote. For consonants after which system 100 automatically removes the apostrophe, e.g., after "qual", the loop consists of two steps, i.e., the letter followed by an apostrophe, and the letter followed by a space character. The sequences described herein in one embodiment begins with the correct sign, which is placed automatically by system 100 when the user presses the activator event for the first time. After the other options are output as part of the loop, the loop continues again with the correct output, etc. When the first output causes the removal of an apostrophe, then the letter followed by the apostrophe appears in following position in the IME loop.

Examples of IME loops where the first output is rule-based, i.e., correct, and in this example is activated with a first press of the apostrophe key; last output is identical with first, and indicates where the loop begins again, include:

perche+'=perché→perchè→perchê→perché'→perche'→ [repeat from "perché"]

e+'=è→é→ê→è'→e'→[repeat from "è"]

po+'=po'→pò→pó→pô→po''→[repeat from "po'"]

omicidi+'=omicidî→omicidì→omicidí→omicidî'→ omicidi'→[repeat from "omicidî"]

qual+'=qual+SPACE→qual'→[repeat from "qual+SPACE"]

qui+'=qui[apostrophe removed]→qui'→quì→quí→quî→ [repeat from "qui"]

For upper case letters the output is identical, but in upper case.

If the activator event is an accented letter instead of, for example, an apostrophe, the output is slightly different because the steps of the IME loop do not include entries with an apostrophe in such an embodiment unless the rules for the current word indicate that the word is known to system 100 to exist with an apostrophe. There are no ambiguities about possible closing quotes and other non-word apostrophe characters as such characters would be entered using the apostrophe key rather than using an accented letter. If the initial automatic change of system 100 transforms the accented letter to a letter followed by an apostrophe, or to the letter without any sign at all, then that initial correct output is at the end, a new beginning of the IME loop. For example:

perch+è=perché→perchè→perchê→[repeat from "perche"]

è=è→é→ê→[repeat from "è"]

p+ò=po'→pò→pó→pô→[repeat from "po'"]

omicid+ì=omicidî→omicidì→omicidí→[repeat from "omicidî"]

qu+ì=qui[accent removed]→quì→quí→quî→[repeat from "qui"]

If the activator event is a repeated unaccented vowel instead of an apostrophe or an accented letter, the output is slightly different, and based on the rules for the current word, the IME loop begins either with a double vowel if the word is known to exist with a final double vowel, or with an appropriate accent or apostrophe. For example:

perche+e=perchθ→perchΠ→perchΛ→perchee→[repeat from "perchθ"]

po+o=po'→pβ→p∴→p⊥→poo→[repeat from "po'''"]

zi+i=zii→zΞ→zP→zT→z1'→[repeat from "zii"]

qui+i=qui[no accent]→quΞ→quP→quT→quii→[repeat from "qui"]

Different implementations of system 100 are capable of providing different sequences, for example allowing for all the possible combinations of accents followed by the apostrophe, rather than only the correct accent. Alternatively, system 100 is designed to include a subset of a given implementation considering that in Italian the circumflex accent is generally used only on the letter I, and the acute accent is generally only used with E and O. The implementation described herein accommodates the input of foreign words, for example non-Italian words, resulting in loops that are identical apart from the initial output which is context-based, and therefore more predictable, which is a more intuitive system for the user regardless of the letter.

Another possible implementation of system 100 considers the ACUTE, GRAVE, CIRCUMFLEX and APOSTROPHE flags associated with the rules entry that produced a match for the current word. Depending on the flag, the combinations that had no matching flag are excluded from the IME loop, or alternatively appear at the end. Another embodiment of system 100 takes into consideration whether the current word is written in a context where a closing single or double-single quote is expected, and adds these options to the loop, optionally to the beginning of the loop in the event the activator event was the apostrophe.

An alternative embodiment of system 100 is substantially similar to the current implementation of the present invention except that if the activator event is the apostrophe and the rules for the current word confirm that the word is certainly written with a certain accent or apostrophe with no ambiguity or the possibility for the word to be written without sign, and the context is such that a single closing quote is expected, then a first press of the apostrophe produces the correct sign after the word, and the second press adds the closing quote. Similarly, in a context where double-single quotes are used instead of single quotes, a third press adds the second closing quote. Afterwards, the IME loop continues with the other signs. Another alternative embodiment learns from previous user choices, and proposes an IME loop where the most frequent previous choices appear first. The data is associated to individual words, or grouped by letter (A, E, I, O, U, consonants). Another alternative embodiment considers the final selection resulting from the use of the IME loop, and adds an appropriate entry in the rules, so that a following time the word is written with the same activator event, or optionally even with another activator event, the first output without even waiting for the IME loop is the one previously chosen through the IME loop. Different variations or program settings make it possible to make the record temporary or permanent, and automatic or based on user action. An additional alternative embodiment allows for the new rule to be automatically recorded for a word after the user wrote a word in a certain way thereby overriding the initial default output of system 100 for a certain number of times, and optionally without ever accepting the default output for that word. In a further alternative embodiment, a POSTAPOSTROPHE condition retroactively overrides a previous automatic conversion of an apostrophe to an accent, or the removal of an apostrophe, even as part of an IME loop, for exampled where the user is trying to write "José's car is red"). This is because a POSTAPOSTROPHE condition typically indicates a non-Italian context in which an Italian word or suffix rule is applied by mistake, or in which an IME loop is initiated by mistake. The above alternative embodiment is optionally extended to activate a re-correction or further modification after a POSTAPOSTROPHE string, and also in general whenever the activator event is followed by a letter thereby placing the previous output in the middle of a word rather than at the end of it. This is useful for example for languages where it is of advantage to give priority to correct an unmodified input of the apostrophe sign.

Additional Considerations for Italian

The addition of letting system 100 add spacing as appropriate allows the use of an activator event or character to be similar to or equivalent to a single key press. The particular procedure is applied for automatically inserting a space but without requiring applying logic to place the correct accent or apostrophe. As a result, system 100 provides a reduction of key presses compared to traditional input. The following are examples thereof:

Example—Traditional input: L'alba é bella (14 key presses, requires appropriate keyboard and writing knowledge)

Example—Intermediate system: L'alba e' bella (15 key presses, easy input)

Example—Extended system: L'alba e'bella (14 key presses, easy input)

Example—Possible option/variant to 3.: L'alba ébella (13 key presses, easy input using both apostrophe and any accented key, which is automatically corrected if necessary)

Example—Possible variant of 1.: L'alba èbella (13 key presses, requires appropriate keyboard and writing knowledge)

In all cases the output would be L'alba è bella

An extended system embodiment accepts the input of a space key after the apostrophe. When the space key is pressed, or if the vowel-apostrophe combination is followed by a punctuation character, no space is inserted. The automatic space insertion occurs or is confirmed if the apostrophe is followed by a letter, number or graphical sign that if it occurred alone as part of a sentence would require a space character before it.

For certain characters which normally occur in pairs, such as parentheses, brackets, single quotes, double quotes and other characters, no space character is normally placed before the closing item. When these characters are graphically different, such as is the case for the "(" and ")" parentheses, system 100 determines whether they require a space before them or not in the event that they appear after an apostrophe input that is processed in such a way as to possibly require the automatic insertion of a space character. Some characters can also be written as graphically identical signs, and based on the context they are interpreted either as opening or as closing items. These characters include the double quote and the simple quote character, which in general is the same character as the apostrophe. For example, the user writes:

è"p . . .

In the above case, system 100 adds a space after the accented letter if the quote character is an opening quote. If the type of the quote character whether it is an opening or closing quote is itself determined by the presence of a space or a letter before it, then no result is determined and the context remains ambiguous. System 100 therefore keeps track of opening and closing double quotes as system 100 already does for single quotes, or alternatively in such a case the automatic insertion of the space character is deferred until the user enters an additional character after the quote character. In such an embodiment, the type of quote is determined not by the characters before it but by the text following it. A closing double quote is typically not immediately followed by a letter or number, but instead is followed by a spacing or punctuation sign. By applying such a detection rule or an equivalent one, the type of double quote is determined, and if the quote is identified as an opening double quote, a space is retroactively inserted between the accented character or character with apostrophe and the opening double quote.

The specific output of different combinations of an accented vowel followed by a closing single quote, or of a vowel followed by an apostrophe followed by an identical sign which is a closing quote, or of an unaccented vowel followed by a closing quote, which are rare but exist, are all possible with system 100 described herein by repeated pressing of the apostrophe key until the desired combination is output such as with an IME loop which includes not only accent variations but also accent and apostrophe combinations.

In French and according to some editorial guidelines, the set of characters that are preceded by a space includes punctuation signs which are composed of more than one graphical mark such as "?", "!", ";" and ":". In Italian these punctuation signs normally have no space before them. In one particular embodiment of system 100, the space character is not automatically inserted immediately after the apostrophe is processed but after the character after the apostrophe is input by the user. In the event where system 100 produces incorrect output which results either in a missing space character or in an undesired space character, the user can go back one character using the backspace or cursor left key for example, and respectively either add a space or continue writing. Such an embodiment of system 100 includes the option not to re-correct or to further modify, or to alternately re-correct or further modify after the user overrides an automatic correction.

Sample input: la liberta'(e'perche')
Resulting output: la libertà (è perché)

(Spaces automatically added before words and other non-punctuation signs)

Sample input: la liberta'; e'"perche'"
Resulting output: la libertà; è "perché"

(No space automatically added between apostrophe and punctuation or closing quote, but added before opening quote)

In some embodiments of system 100, there are special cases in which even in an Italian context the apostrophe sign after a vowel is not immediately followed by a space but by a letter. This is the case for example with English possessives and other patterns e.g., "I'd try" which in an Italian context are usually related to either English or German, and are solved with appropriate POSTAPOSTROPHE entries. Thus, the additional step described above, like other parts of system 100, optionally removes any space characters it automatically added if they are followed by a POSTAPOSTROPHE string.

Sample Implementation: Processing of German Text Input

German uses the special characters "ä", "ö", "ü", "β" in lower case, and "Ä", "Ö", "Ü" in upper case ("β" becomes "SS" in upper case). This is a total of 7 special characters compared to basic Italian's 12 characters. The sign on top of the vowels is called an umlaut. Where these characters are not available on the keyboard, character set or output system, the traditional replacements are "ae", "oe", "ue" and "ss", respectively. In rare cases, for example Internet web and email addresses, it has become accepted use to also use "a", "o", "u"

instead of "ä", "ö", "ü" in both lower and upper case. The special characters used in German are associated with needs that in the case of text input are in part similar to Italian. Unlike Italian, however, these characters appear more frequently, appear in the middle of words, and are more difficult to be determined. System 100 accommodates inputting these characters when they are not present on the keyboard.

System 100 utilizes different optional ways to enter the special characters for German. In one embodiment a keyboard hook function is utilized that intercepts the combinations of Alt+a, Alt+o, Alt+u, Alt+A, Alt+O, Alt+U, Alt+s and Alt+S, and changes the output to ä, ö, ü, Ä, Ö, Ü, β, SS. The activator event is set to Alt by default in one embodiment but could be changed in other embodiments. Alternatively, input of German characters is possible through IME loops. E after A, O or U results in the output to be changed to Ä, Ö, Ü. When E is pressed again, the less frequent AE, OE, UE pairs are produced. When E is pressed again, the very rare ÄE, ÖE, ÜE pairs as in "Europäer" and "Böe" are generated. If E is pressed again, the loop begins again from Ä, Ö, Ü. This applies both to upper and to lower case. If the case of E is different than that of the first letter, the case of the first letter is the one that is applied to the output making it easier to write initials with umlauts. Options for different behavior are provided.

In lower case only, an IME loop that produces β and other character combinations is activated by repeated presses of the "s" key, as follows: s, ss, β, βs, sss. When the "s" key is pressed a sixth time, the loop starts again from the simple "s", and so on. The order of the steps in this loop is based on frequency. Especially after the writing reform ("Rechtschreibreform") approved in 1996, "ss" is more frequent than "β". Both "βs" (as in "Großschreibung") and "sss" (as in "Flusssand") are rare, but possible. The default initial output of system 100 is optionally made dynamic based on rules as with Italian. For example, system 100 automatically converts AE, OE and UE pairs to the respective vowel with an umlaut, as appropriate.

Sample Implementation: Processing of Spanish Text Input

Spanish uses the special characters Á, É, Í, Ó, Ú, Ü, Ñ, both in lower and in upper case appearing anywhere in the word as well as the special punctuation signs "¿" and "¡". The apostrophe character is used for single quotes and non-Spanish patterns such as POSTAPOSTROPHE. Thus system 100 can be adapted to a system similar to an Italian embodiment where the rules for each vowel consist of simple fallback rules with an ACUTE flag so that after the apostrophe is pressed following a vowel, the result is the vowel with an acute accent. For consistency, the apostrophe is also used to place the tilde on top of the N. The IME loop for the vowels toggles between all possible signs, as for Italian, or alternatively between the acute accent, the umlaut optionally for the letter U and the vowel followed by an apostrophe. For the N, the IME loop toggles between the N with tilde and the N followed by an apostrophe. The special signs "¿" and "¡" are generated via an IME loop that produces the special character when "?" or "!", respectively, are pressed an even number of times. Such an embodiment simplifies the writing of Spanish using a non-Spanish keyboard where currently different combinations of Ctrl, Alt, Shift, Alt+digits or other difficult to enter and to remember keyboard sequences are used depending on operating system 128 and application 130. When people write with a pen the sign is placed after writing the vowel and not before. As with Italian, system 100 described makes the input of Spanish intuitive for keyboard input on a keyboard without the Spanish characters.

Sample Implementation: Processing of International Text Input

In one embodiment IME loops are used to generate all variations of a certain character when that character is input a certain number of times, for example pressing a certain key two, three times or more to initiate the output of special characters rather than the same letter repeated two, three or more times. In an alternative embodiment, system 100 initiates an IME loop when a certain character is pressed in combination with a qualifier key such as Alt. For example, repeated presses of Alt+A produce all the variants of A with various diacritical signs.

In one particular embodiment a simpler approach of system 100 is provided by combining the loops for Italian with a combination of Alt+letter filters which for example produce "ñ" when Alt+n is pressed (Spanish character), "β" when Alt+s is pressed (German character), "ç" when Alt+c is pressed (French character), etc., and optionally inserting the vowel+umlaut (German character) step in the IME loops for Italian. For languages such as Greek where certain letters may have different shapes depending on the position in the word, for example sigma, at the end of word or beta at the beginning of a word, system 100 places differently shaped characters based on the context. At the beginning and in the middle of words this is done immediately, whereas conditions requiring different handling at the end of a word are processed retroactively, as soon as a non-word character is entered. Each time characters are removed or added from or to the beginning or and of a word, the procedure dynamically applies the required changes in order to keep the initial beta or the ending sigma correct.

Sample Implementation: Input of Currency Symbols

In one embodiment of the invention, system 100 includes an option to place the euro sign in a first or second position based on user choice in the IME loop associated to keys such as $ or £. For example, pressing the dollar key once produces the dollar sign, and twice it produces a euro sign, or vice-versa. More complex loops generating a wider variety of currency symbols are associated either to an existing currency key or to an otherwise unused key such as the backslash ("\"). As considered for the input of Italian, the order in which the currency signs appear in the IME loop is changed dynamically in one embodiment. System 100 automatically outputs the most frequently-used currency symbol when a certain key is pressed the first time, and then in order of frequency of use produce IME steps when the key is pressed again. Alternatively system 100 maintains the first character output constant, for example to be identical with the character normally associated to the keyboard key, and to affect the output of the following characters such as when that key is pressed more than once. The dynamics by which the order of the IME steps changes is controlled by parameters indicating, for example by how much, percentage or absolute value, a certain key becomes more frequent than another one before it takes its position in the loop, and whether a change in order requires a certain number of consecutive hits by a character before it is considered for a higher position in the IME loop.

Additional Options and Variations

Considering that system 100 determines the relationship between 7-bit input characters and their accented forms, and converts between the two by applying different techniques and considerations, an optional implementation of system 100 is where system 100 is directly interfaced with contexts where the user enters an Internet Uniform Resource Locator (URL) commonly referred to as an Internet address, and by determining which characters are acceptable in the URL string, it converts illegal or prohibited signs to legal signs by applying different variations if more than one acceptable variation exists. For example, Internet World Wide Web addresses can be recognized because they begin with prefixes like "http://" or "https://". In the domain and host names which make up such web addresses, it is currently not allowed to include any character other than letters from A to Z without accents, digits and the minus sign (hyphen). If the user, remembering a company name such as "Müller", entered a web address of "www.müller.com", the browser only attempts to connect to the server with the name exactly as typed, which results in a failure or error because such a domain registration is not even possible. System 100 as described here may first attempt to connect to www-.müller.de, but if that failed, system 100 in turn attempts to connect to www.mueller.de, or www.muller.de, or both, in a desired order until a connection succeeds. If the domain or host names contained more than one special character, they are in a similar fashion converted to characters that are acceptable for the type of URL being entered, first attempting expansion, and optionally stripping of accents, and then optionally combinations thereof). Similarly for the special signs of Italian, the accents are removed without replacing them with apostrophe signs and also removing any existing apostrophe signs that may have been entered. The same occurs for the special signs of French and Spanish, leaving plain letters A to Z. Any syntax that at the time of coding of system 100 is known to be invalid is optionally still attempted, either as a first try, or as a last attempt, with consideration to the fact that it is likely that special characters will in the future become acceptable even in domain and host names.

As for the activator events for Italian and other comparable languages, instead of or in addition to the already mentioned accented vowels, and the apostrophe and similar keys, the activator event may include the repeated press of a vowel key since vowels almost never appear more than once in a row in Italian, or the action of holding a key pressed for longer than a certain predefined amount of time. For example, entering "perchee", or entering "perche" and holding down the last key a little bit longer than usual automatically results in "perché". Pressing "e" again or holding it down even longer initiates an IME loop thereby proposing further possible signs. A similar technique is applied to special signs such as opening and closing double quotes. For example, system 100 associates an IME loop to the double-quote character with the first press generating a plain double quote, and repeated presses producing either opening and closing double quotes in a predictable constant order, or with the entire order based on frequency and context considerations. There are different quote characters including opening quote, closing quote, and, optionally, neutral quote. Alternatively, IME loop functionality is implemented in such a way such that the first input of the double-quote character is nominally automatically changed to the correct opening or closing double quote, but subsequent repeated presses restore the original manual input or loop through the other possible related characters.

The embodiment of system 100 providing the option of simply holding a key pressed is applicable to all embodiments including to all cases where activator events as well as the repeated input of a certain character are utilized for activating a certain event such as a correction, a re-correction, or further modification, or the initiation or next step of an IME loop. Such an action of holding down a key for a predetermined duration optionally provides a special meaning for some characters and contexts depending on the implementation, and can still be considered as a more traditional auto repeat for other keys or contexts. As for the meanings that can be associated to certain input patterns, including holding a key down, repeated press of the same key, with or without consideration to context, system 100 considers and applies an activator event, for example to place an Italian sign, overriding a previous automatic correction, initiation or continuation of an IME loop, and requests to display some type of information, for example linguistic help. These are optionally implemented in any combination.

System 100 optionally includes a number of options to temporarily disable all or part of its actions. This may be done for example by assigning a certain key or sequence of keys to the temporary turning off of system 100 which in one embodiment is limited to the next character, or to all characters until the same certain key or sequence of keys, or another key or sequence of keys is input meaning that system 100 continues operation. Certain keys which on most keyboards have a status indicator light such as Scroll Lock can also be used, in which case the light becomes a useful indicator of system status. Another option to disable system 100 and allow for unmodified, input in one embodiment is to consider certain qualifier keys which when held down during input of other text cause system 100 not to take any action. Another additional option to allow for unmodified input is to not take any action if the user explicitly resorted to an Alt+(0)+number combination, or another keyboard sequence which by default is used on the operating system to input certain characters even if they are not present on the keyboard.

The actions that cause certain events to occur in system 100 are based in one embodiment on the analysis of context, for example consideration to pending single quotes, or in German the repeated press of "e" after "a", etc., and linguistic and literary factors such as the likelihood that certain text patterns, for example double or triple vowels, quotes, or currency symbol, appear as part of the traditional text flow or not. System 100 uses certain characters both in a normal and in a special manner. In a particular embodiment of system 100, a default implementation applied to Italian consists of the same set of activator events serving dual purposes of allowing for the input of special characters and also of correcting certain common accent and apostrophe errors.

One embodiment to handle unknown words for languages such as Italian where accent rules have a strong focus on the word suffix is where system 100 considers the best accent for an unknown word based on the longest matching suffix of other word entries and optionally suffix entries in the list of rules. As the number of entries in the rules increases, such an embodiment produces better results when applied to unknown words than the fallback rule and in some cases even suffix rules. Furthermore, as an additional option in a case where a previous check does not produce any matches, for the purpose of matching the suffix of the unknown word with the suffix of existing entries, system 100, with exception to the last vowel, considers certain sets of letters to be identical, that is to count as a match. For example, all vowels are considered as a universal vowel matching character, so that "ahime" matches "ohime". To further deal with unknown words an optimal manner, system 100 provides different options to extend its dictionary of rules. One embodiment of system 100 provides for the rules to be updated from the Internet by loading a new set of published rules and through the user interface where the user may add, edit or remove individual rule entries. Optionally, system 100 either automatically adds to the rules, or modifies a rule entry if it exists in a different format, instances where the user changed, either with the IME functionality or by re-writing, or by temporarily switching off system 100, the output of system 100, generating a word that system 10 otherwise changed. Optionally, this step of applying the change to the set of rules is semi-automatic, not user initiated but using user confirmation. This embodiment also learns new POSTAPOSTROPHE words or removes them from the list. Optionally, the set of rules includes some flags that are considered or not based on user interface settings, which determine whether certain ambiguous entries require an explicit choice by the user rather than system 100 proposing a certain initial output without further action.

A further operating mode of system 100 when applied to file or clipboard data, system 100 automatically detects certain character set errors which result in wrong characters appearing in place of accented letters. To accomplish this, system 100 uses a series of lists each associated to a common, known, transmission or character set problem, for example a 7-bit national character set used instead of an 8-bit one, the eights bit being stripped, a character set of one system used in the context of a different system, etc. Entries in these lists are used as activator events equivalent to, for example, accented vowels that are normally used where the correct character set is used. The replacement list is selected either manually, or automatically, applying all lists to the same text, and then the one list that resulted in the text containing fewer unknown words is selected based on either a spelling checker dictionary or on the accent rule entries.

In one embodiment of system 100 applied during typing, a small symbol on the screen changes color as a function of the reliability of the rule that was applied, for example ranking word entries higher than suffix entries, and entries with only one apostrophe or accent flag as less ambiguous than entries with multiple such flags, and the completeness of the current text context data where only one character of available text context data for example causes the color to appear as a yellow or orange warning. One variation of the rules system is that entries for accented and unaccented verbal forms need not include all possible variations as a static database, but rather consider that Italian uses about 110 clearly-defined verb categories, each with its known derived forms, to algorithmically generate only the required verb forms when necessary.

List of Replacement Rules

If the word to be replaced has an accent or apostrophe, then it is not placed in the list of replacement rules, but instead the appropriate COMPLEX attribute in one of the previous lists is used, i.e., five vowel lists, or consonant list. If system 100 is applied to ancient Italian, or to some current Italian dialects such as in the Rome or Florence regions where words are often transformed to a truncated form using an apostrophe, then in an alternative embodiment the fallback rules are set for the vowel-lists to APOSTROPHE entries rather than GRAVE or ACUTE. Thus, the list of accented words are complete and exhaustive because all words with a sign that do not match any rule would be output as words with an apostrophe rather than words with an accent. In ancient Italian, and in some of today's regional dialects, it is easier to define accented words rather than words with an apostrophe. In modern Italian, words with an apostrophe are more limited so in one embodiment these are considered as exceptions from accent rules. In modern Italian accented words are also easily defined although their number is higher than that of words ending with an apostrophe. A system giving a higher priority on a complete list of accented words may reach a point where, even for modern Italian, it may be of advantage to use the APOSTROPHE flag for fallback entries. In one particular embodiment of the invention, system 100 utilizes resource-efficient rules lists, and is optionally more conservative in reaching conclusions. Thus, system 100 accommodates words that do not match any rule other than a fallback rule, in which case a more frequently occurring accent is placed on the word.

It is conceivable that, where system 100 is adapted for an ancient Italian or regional dialects application, or in a context where a second language that makes intense use of apostrophe characters is frequently used together with Italian, system 100 optionally incorporates a feature similar to the re-correction or further modification applied after the detection of POSTAPOSTROPHE strings, but generalized to all apostrophe characters which are initially converted to accents then followed by more text rather than non-word characters. Such an optional variation of system 100 is utilized if the additional feature to automatically insert space characters after words ending with an apostrophe or accent is not active. The list with the replacement rules is separate from the lists for words ending with a vowel and that for words ending with a consonant for reasons of logical and computational simplicity. In a case where a word is not terminated with any activator events, and no other special options are enabled to correct, for example weekdays or words that should have a final accent or apostrophe but have been written without one, then system 100 checks the list of replacement rules if these are enabled rather than also the lists with all the entries which are necessary for the proper placement of accents and apostrophe signs. Trigrams, combinations of three letters, are optionally used instead of bigrams to further improve the recognition accuracy at the expense of some additional memory requirements.

Example Implementation

The following is a description of a sample implementation of a text processing system in accordance with the present invention. The implementation is described using a pseudocode type description. Junction points are marked using angle brackets to indicate branch points in the logic flow. Comments begin with double backslash characters (//), and the event loop starts from [Procedure MainInputLoop].

[Procedure CheckVowelWordSigns]

// This procedure gets an input word CurrentWord, ending with a vowel with or without diacritical sign or apostrophe, and returns accent/apostrophe information about the word. By definition, a word is a string of one or more alphabetic letters with or without diacritical signs, in upper or lower case, allowing for hyphen signs inside the word, as long as each hyphen is both preceded and followed by at least one alphabetic letter, and allowing for one optional apostrophe at the end of the word.

[normalize CurrentWord, converts all letters to lower case letters without diacritical signs, and removing final apostrophe, if present]

// The above step is optional in the event that the comparison functions ignore differences in case and in diacritical marks.

[If CurrentWord ends with letter A, set CurrentList to List-A]

[If CurrentWord ends with letter E, set CurrentList to List-E]

[If CurrentWord ends with letter I, set CurrentList to List-I]

[If CurrentWord ends with letter O, set CurrentList to List-O]

[If CurrentWord ends with letter U, set CurrentList to List-U]

[ListPosition=beginning of CurrentList]

<Junction 1>

[(Rule at ListPosition in CurrentList is a suffix rule and CurrentWord ends with that suffix) OR (Rule at ListPosition in CurrentList is instead a word rule and it matches Current-Word)?] If No increase ListPosition and goto Junction 1.

// Now we have a positive match. In the worst case it's the FALLBACK rule, which is at the end of the first part of the list.

[Set ReturnRule to Rule at ListPosition in CurrentList]

[If ReturnRule is a suffix rule, then set ReturnAttribute to NOT EXHAUSTIVE, else set ReturnAttribute to EXHAUSTIVE]

[If ReturnRule has APOSTROPHERARE flag and current program settings indicate to ignore such case, remove APOSTROPHE flag from ReturnRule]

[If Rule does not have FALLBACK flag, set ListPosition to position in CurrentList where the rule with FALLBACK flag is located]

[Set ListPosition to next position]

// now we are at the first rule after FALLBACK, which is either the first entry in the second part of the list, or we are beyond at the end of the list <Junction 2>

[If ListPosition is beyond end of list] Return "ReturnRule, ReturnAttribute"

[(Rule at ListPosition in CurrentList is a suffix rule and CurrentWord ends with that suffix) OR (Rule at ListPosition in CurrentList is instead a word rule and it matches CurrentWord)?] If No increase ListPosition and goto Junction 2.

// Now we have a positive match in the second part of the list

[Set ReturnRule to Rule at ListPosition in CurrentList]

[If ReturnRule has APOSTROPHERARE flag and current program settings indicate to ignore such case, remove APOSTROPHE flag from ReturnRule]

[Set ReturnAttribute to EXHAUSTIVE]

Return "ReturnRule, ReturnAttribute"

[Procedure CheckConsonantWordSigns]

// This procedure gets an input word CurrentWord, ending with a consonant with or without apostrophe after it, and returns accent/apostrophe information about the word.

[normalize CurrentWord, converting all letters to lower case letters without diacritical signs, and removing final apostrophe, if present]

// The above step is optional if the comparison functions ignore differences in case and diacritical marks

[Set CurrentList to List-Consonants]

[ListPosition=beginning of CurrentList]

<Junction 1>

[If ListPosition is beyond end of list] Return "No entry found"

[(Rule at ListPosition in CurrentList is a suffix rule and CurrentWord ends with that suffix) OR (Rule at ListPosition in CurrentList is instead a word rule and it matches CurrentWord)?] If No increase ListPosition and goto Junction 1.

[Set ReturnRule to Rule at ListPosition in CurrentList]

[If ReturnRule has APOSTROPHERARE flag and current program settings indicate to ignore such case, remove APOSTROPHE flag from ReturnRule]

[If ReturnRule is a suffix rule, then set ReturnAttribute to NOT EXHAUSTIVE, else set ReturnAttribute to EXHAUSTIVE]

Return "ReturnRule, ReturnAttribute"

[Procedure CheckPostApostrophe]

[normalize CurrentWord, converting all letters to lower case letters without diacritical signs, and removing final apostrophe, if present]

// The above step is optional if the comparison functions ignore differences in case and diacritical marks

[Set CurrentList to List-PostApostrophe]

[ListPosition=beginning of CurrentList]

<Junction 1>

[If ListPosition is beyond end of list] Return "NO"

[Rule at ListPosition in CurrentList matches CurrentWord?] If No increase ListPosition and goto Junction 1.

Return "YES"

[Procedure CheckReplacement]

[normalize CurrentWord, converting all letters to lower case letters without diacritical signs, and removing final apostrophe, if present]

// The above step is optional, if the comparison functions ignore differences in case and diacritical marks

[Set CurrentList to List-Replacements]

[ListPosition=beginning of CurrentList]

<Junction 1>

[If ListPosition is beyond end of list] Return "No entry found"

[Rule at ListPosition in CurrentList matches CurrentWord?] If No increase ListPosition and goto Junction 1.

[Set ReturnRule to Rule at ListPosition in CurrentList]

Return "ReturnRule"

// by definition must be of type COMPLEX

[Procedure IsItalian]

[If the current application supports querying about language in use at current text input position, query application and return Yes if language is Italian, and No if not]

//Different approaches may be undertaken

[Is there a rules lists with exhaustive entries for all Italian words?] If Yes, check if word appears in vowel/consonants rules lists (return attribute must be EXHAUSTIVE) and is not flagged as NOTITALIAN, and return Yes if if the word is found and is Italian, and No if not

[No rules-lists with exhaustive word entries? Then apply other algorithm, for example looking up all letter pairs in current word in a bigram table having 1 entries for letter pairs that exist in Italian words, an 0 for letter pairs that are not used in Italian, and return No if any pair of two consecutive letters in the word produces a 0, or otherwise return Yes]

Sample bigram table for Italian (real data, but variations are possible to allow for different levels of tolerance, e.g. with more or less consideration towards rare words and patterns, etc.):

ABCDEFGHIJKLMNOPQRSTUVWXYZ

A=01111110100111110111110001// Row for pairs "aa" to "az"

B=11011000100100100100100000// Row for pairs "ba" to "bz"

C=10101001100101101100100000// etc.

D=10011000100000100100100000

E=11111110100111111111110101

F=10001100100100100100100000

G=10001011100111100100100000

H=10001000100000100000000000

I=11111110100111111111110001

J=00000000000000000000000000

K=00000000000000000000000000

L=11111110100111111011110001

M=11001000100010110000100000

N=10111110100001101011110001

O=11111110100111110111110001

P=10001000100100110111100001

Q=00000000000000000000100000

R=11111110100111111111110001

S=11101110100110111111110000

T=10001000100010100101100000

U=11111110100111110111000001

V=10001000100000100100110000

W=00000000000000000000000000

X=00000000000000000000000000

Y=00000000000000000000000000

Z=10001000100000100000100001

[Procedure GetNew Context]

//Get (at least) the current word, until the cursor position. If here, then there was no opportunity to create a context buffer yet, or it was lost after vertical cursor movement, mouse action or keyboard, menu or other command that might have affected the text. When requesting or getting context data, system 100 attempts to also get insert/overstrike, language and pending closing single quote information. If no such data is available, default values are used. If however context data was previously available for that input window, then the Insert/Overstrike setting is preserved, and not reset to a default value.

[If operating system 126 and current application 130 support querying of context data as part of an application-specific interface, or for purposes of accessibility for disabled users, or as part of an IME interface, or as part of an error handling interface, or as part of any other interface capable of providing that information, the context is obtained from there, and return]

[If the hardware, operating system 126 or current application 130 (e.g. a word processor) provides a way of directly accessing the text buffer memory (RAM), e.g. because the memory region is constant, or pointers to that region are known, the context is obtained from there, and return]

[Locate cursor position and apply OCR to get current word context, for example using library provided by a remote system 266 via network 264. If the screen is not bitmapped, but character-mode, it is only necessary to isolate text from non-relevant characters. Return if successful.]

Clear local context data and return

// Fail, there is no context data

[Procedure MainInputLoop]

// Main input loop. Shields the text-processing part from a few non-text-stream issues.

<Junction 1>

[Wait for keyboard or mouse event]

[Non-character event potentially involving context disruption?] If Yes, GetNewContext and goto junction 1

// Events that involve context disruption include: new window; cursor up/down and other cursor positioning keys (e.g. Home, End, Page Up, Page Down) other than cursor left/right; mouse click events that cause cursor to be repositioned; menu selections and keyboard accelerators to menu selections; command-shortcuts.

[Cursor left or right, or Delete, or Backspace key?] If Yes, update local context buffer contents and insertion position accordingly, then goto Junction 1

[Insert key?] If Yes, update insert/overstrike mode status in context data, then goto Junction 1.

[Does current application support notification of language and insert/overstrike status?] If Yes, read these settings again and update them in the local context data.

[Text character?] If Yes, update local context buffer, then call TextInputLoop. If TextInputLoop applied changes to the output stream, update context buffer again and send backspace or cursor-left and new characters as appropriate.

// Text characters include letters, numbers, space, punctuation, and all other graphical characters that produce an editing action.

Goto Junction 1

[Procedure TextInputLoop]

// Text input loop, gets called whenever a new character appears in the input stream.

[Is the character an activator event?] If Yes execute ActivatorCharacter, then Return.

// depending on program options, activator events can be the apostrophe and similar characters, or an accented letter

[Non-word character?] If Yes execute NonWordCharacter.

Return

[Procedure ActivatorCharacter]

// If we are here, in an Italian implementation it means that the user pressed an accented vowel key, or an apostrophe after a word

[Same position as a previous activator event that caused system action, which was manually changed by user?] If yes, Return.

// Do nothing if something just happened, and the user changed what was done. If however nothing is done, and the user again changes the input, then again something is done, because this time the previous time was not such that system action was initiated. The result is that something is done every second time.

[Same activator event as previous character?] If Yes, execute next step in ImeLoop, then Return.

[Acute character, or other character equivalent to apostrophe?] If Yes, replace it with apostrophe // note: change in local context data only; later all differences will be cumulatively applied to output stream. This transformation from acute etc. to apostrophe is an example of many optional things that can be done.

[Activator event is accented vowel?] If yes, add it to the current word

// Here system 100 is adding to the local context data. The application already received the character, and what can be done (later, if neccessary) is to send a fake backspace (and/or cursor left, if overstrike mode) followed by new data (unless backspace alone was sufficient).

[Last character of the current word is a vowel?] If Yes CheckVowelWordSigns else CheckConsonantWordSigns

[No ReturnRule was found?] If so, Return

// This can happen if the word ended with a consonant, and input was OK (word not in list), because vowel lists provide fallback rules

[ReturnRule has COMPLEX attribute?] If Yes, replace word with COMPLEX word (if the word was different), and Return.

// This is an example of action that can be turned on or off by the user, or depending on the implementation // Only three cases possible: vowel with accent, vowel with apostrophe, consonant with apostrophe

[Activator event is on or after vowel?] If Yes

{

[Activator event is accent?] If yes, ProcessVowelAccent, else ProcessVowelApostrophe

}

Else ProcessConsonantApostrophe

Return

[Procedure NonWordCharacter]

// checks replacement rules, and POSTAPOSTROPHE

[Did system 100 change user input of apostrophe immediately before this word?] If yes

{

[CheckPostApostrophe gives POSTAPOSTROPHE match on current word?]

If yes, restore previously changed apostrophe, and Return

}

CheckReplacement

[ReturnRule has COMPLEX attribute?] If Yes, replace word with COMPLEX word (if the word was different)

Return

[Procedure ProcessVowelApostrophe]

// Handling of Word ending with vowel and followed by apostrophe activator event. Word in this entire subroutine means word with apostrophe // This is one of the most complex cases, because the intention may have been to enter a closing single quote (an opening single quote would not have immediately followed a word, but rather it would have preceded it)

[ReturnRule has APOSTROPHE attribute, and none of GRAVE or ACUTE or CIRCUMFLEX attributes?] If Yes

{

NewWord=Word

[ReturnRule also has NOTHING flag?] If Yes, Optionally (based on implementation and/or settings): inform user via tool tip that the case is ambiguous, and could be resolved in more than one way, adding additional ReturnRule information as appropriate Return

}

// the above is the simplest case: no ambiguity, nothing to correct; we could however issue an optional information message if the rule also had the NOTHING flag. Most practical ambiguities are however taken care of via APOSTROPHERARE, which is already filtered based on implementation/settings.

[ReturnRule has APOSTROPHE attribute, and expecting a closing single quote?] If Yes

{

NewWord=Word

Optionally (based on implementation and/or settings): inform user via tool tip that the case is ambiguous, and could be resolved in more than one way, adding additional ReturnRule information as appropriate Return

}

// the above represents a statistical fact that if the word can be written with an apostrophe, and a closing quote is expected, then it is more likely that the user actually wanted to input an apostrophe, even if the word can also be written with an accent

[ReturnRule has NOTHING attribute, and none of APOSTROPHE, GRAVE or ACUTE or CIRCUMFLEX attributes?] If Yes

{

[expecting a closing single quote?] If Yes, NewWord=Word

Else NewWord=Word without apostrophe

Return

}

// If system 100 is here, there is APOSTROPHE as well as one or more other accent flags, in which case, based on a statistical choice, priority is given to the accent, if only one (which is usually the case), or there are one or more accent flags, in which case system 100 changes the apostrophe input to an accent output. This all means that the APOSTROPHE flag can be ignored from here on, as it does not change anything, because the cases in which an apostrophe is output have all already been considered. [ReturnRule has more than one of NOTHING or GRAVE or ACUTE or CIRCUMFLEX attributes?] If Yes
{
NewWord=Word with first most likely accent (first item of sequence used for IME loop for last vowel in word, considering only the accent flags in ReturnRule)
Optionally (based on implementation and/or settings): inform user via tool tip that the case is ambiguous, and could be resolved in more than one way, adding additional ReturnRule information as appropriate
Return
}

// Note: the above is rare

// If system 100 is here, it means that the word has one and only one of GRAVE or ACUTE or CIRCUMFLEX, plus, possibly, APOSTROPHE NewWord=Word with accent as per single accent flag (GRAVE or ACUTE or CIRCUMFLEX)

[ReturnRule also has APOSTROPHE flag?] Optionally (based on implementation and/or settings): inform user via tool tip that the case is ambiguous, and could be resolved in more than one way, adding additional ReturnRule information as appropriate Return

[Procedure ProcessVowelAccent]

// Handling of Word ending with vowel input as accented vowel activator event

// This case is simpler than vowel+apostrophe, because although the accent could be wrong, having to be changed to nothing, or to an apostrophe, the case where a closing quote could have been intended does not apply here

[ReturnRule has only one of APOSTROPHE, GRAVE, ACUTE or CIRCUMFLEX?]
{
NewWord=Word with sign as specified by APOSTROPHE, GRAVE, ACUTE or CIRCUMFLEX
[ReturnRule also has NOTHING flag?] If Yes, Optionally (based on implementation and/or settings): inform user via tool tip that the case is ambiguous, and could be resolved in more than one way, adding additional ReturnRule information as appropriate
Return
}

// If here, the ReturnRule has NOTHING and/or more than one accent/apostrophe flag {ReturnRule has more than one of APOSTROPHE, GRAVE, ACUTE or CIRCUMFLEX?)
{
NewWord=Word, if compatible with ReturnRule flags, or otherwise Word with first most likely accent (first item of sequence used for IME loop for last vowel in word, considering only the accent flags we have in ReturnRule)
Optionally (based on implementation and/or settings): inform user via tool tip that the case is ambiguous, and could be resolved in more than one way, adding additional ReturnRule information as appropriate
Return
}

// If here, the ReturnRule has NOTHING flag and no accent or apostrophe flag

NewWord=Word without accent
Return

[Procedure ProcessConsonantApostrophe]

// Handling of Word ending with consonant and apostrophe activator event

// Here a closing quote could be expected, but the number of possibilities for the word itself are only two: apostrophe or no apostrophe (consonants do not have accents)

[ReturnRule has APOSTROPHE attribute?] If Yes
{
NewWord=Word
Return
}

// If here, the ReturnRule has a NOTHING flag and no APOSTROPHE

[Expecting a closing single quote?] If Yes
{
NewWord=Word
Return
}

// Note: in cases like the above, if in a very demanding editorial context, system 100 ensures that the apostrophe found here after a word with NOTHING and no APOSTROPHE flag actually was the closing quote being looking for, rather than a mistake. In such a demanding context, appropriate information messages are optionally used.

NewWord=Word without apostrophe, followed by space
Return

II Note: in case this space is followed by a punctuation sign, system 100 optionally re-corrects of further modifies the automatically inserted space, removing it. Optionally, system 100 does not even add a space character in the first place.

It is believed that the method and apparatus for processing text and character data of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes. The invention described herein need not implement or require any one particular or all of the embodiments or parts thereof; indeed a system, hardware, or software, may optionally implement any one or more of the embodiments described herein, in whole or in part, at all times or less than at all times, and without requiring any one or more remaining embodiments thereof, in whole or in part, without departing from the spirit or scope of the invention and without providing substantial change thereto. For example, a system may be optimized for Italian text processing with or without using German text processing, or alternatively a system may be optimized for German text processing with or without Italian text processing. Furthermore, a system implementing text processing in accordance with the present invention may be optimized for processing one level or formality of text, for example for newspaper or newsprint text, or alternatively may be optimized for another level or formality of text, such as scientific literature, or alternatively may be optimized for another level of formality of text, such as popular fiction, without implementing or being optimized for other levels or formalities of text as determined by requirements and the desired level or formality of processing, and without departing from the scope or spirit of the invention and without providing substantial change thereto.

What is claimed is:

1. An apparatus, comprising:
   means for receiving input text;
   means for detecting an activator sequence of one or more characters in the input text, wherein the activator sequence of one or more characters includes a possible vowel accent or apostrophe error as determined from a rule of language;
   means for determining a word in the input text;
   means for executing a first modification of a word in the input text in response to the detecting means detecting the activator sequence of one or more characters;
   means for determining the last input character associated with the activator sequence of one or more characters;
   means for detecting one or more repetitions of the last input character; and
   means for executing one or more modifications of the word in the input text in response to the one or more repetitions of the last input character.

2. An apparatus as claimed in claim 1, wherein the detecting an activator sequence of one or more characters includes detecting an actuation of an apostrophe key of a keyboard.

3. An apparatus as claimed in claim 2, further comprising:
   means for detecting a first condition when the word in the input text is at least one of a possible correct Italian word, a possible unknown Italian word, or a possible non-Italian word;
   means for detecting a second condition when a single closing quote is pending from the context of the input text;
   wherein the modifying means does not modify the word if both the first and second conditions are detected.

4. An apparatus as claimed in claim 2, further comprising:
   means for detecting a condition when the word in the input text which immediately follows the activator sequence of one or more characters is associated with an apostrophe mark which in languages other than Italian is used to indicate at least one of a genitive case, an omission of letters, or a plurality of letters; and
   means for restoring the original form of the modified word if the condition is detected.

5. An apparatus as claimed in claim 1, further comprising means for normalizing the input text.

6. An apparatus as claimed in claim 1, wherein the means for detecting the one or more repetitions of the last character further comprises means for detecting one or more repetitions of an actuation of a keyboard key associated with the last input character.

7. An apparatus as claimed in claim 1, further comprising means for displaying a list of alternative available modifications of the word.

8. An apparatus as claimed in claim 1, wherein the modifying means selects one or more modifications of the word based upon a frequency of occurrence of available modifications of the word.

9. An apparatus as claimed in claim 1, wherein the modifying means selects one or more modifications of the word based upon Italian language rules.

10. An apparatus as claimed in claim 1, wherein the modifying means selects one or more modifications of the word based upon a rules list for modifications of the word.

11. An apparatus as claimed in claim 1, wherein the modifying means selects one or more modifications of the word based upon a rules list for modifications of the word, the rules list further comprising a fallback rule for the event in which the rules list does not provide one or more modifications of the word.

12. An apparatus as claimed in claim 1, wherein the modifying means selects one or more modifications of the word based upon a predetermined writing style of the input text.

13. An apparatus as claimed in claim 1, wherein the modifying means selects one or more modifications based upon a previous modification of the word selected by a user.

14. An apparatus as claimed in claim 1, the modifying means provides optimal placement of Italian vowel accents and apostrophes in the first modification.

15. An apparatus as claimed in claim 1, further comprising means for displaying context-specific language information to assist a user to choose correct writing for an intended word.

16. An apparatus as claimed in claim 1, further comprising means for displaying a confidence level indicator based on the predicted accuracy of the modified word.

17. The apparatus of claim 1, wherein the activator sequence of one or more characters includes characters selected from the group consisting of:
   alphabetic characters, accented alphabetic characters, accent characters, apostrophe characters and single quote characters.

18. A computer readable medium tangibly embodying computer readable code stored thereon for implementing a method for processing text, the method comprising:
   receiving input text;
   detecting an activator sequence of one or more characters in the input text, wherein the activator sequence of one or more characters includes a possible vowel accent or apostrophe error as determined from a rule of language;
   determining a word in the input text;
   executing a first modification of a word in the input text in response to the detecting means detecting the activator sequence of one or more characters;
   determining the last input character associated with the activator sequence of one or more characters;
   detecting one or more repetitions of the last input character; and
   executing one or more modifications of the word in the input text in response to the one or more repetitions of the last input character.

19. A computer readable medium as claimed in claim 18, any one of the receiving step, the detecting steps, and the modifying step being implemented via a keyboard hook.

20. The computer-readable medium of claim 18, wherein the activator sequence of one or more characters includes characters selected from the group consisting of:
   alphabetic characters, accented alphabetic characters, accent characters, apostrophe characters and single quote characters.

21. An apparatus, comprising:
   means for receiving input text;
   means for detecting an activator sequence of one or more characters including a possible incorrect Italian apostrophe in the input text;
   means for initiating an input method editor loop in response to the detecting means detecting the activator sequence of one or more characters including the possible incorrect Italian apostrophe in the input text;

means for determining a word in the input text;

means for determining the last input character associated with the activator sequence of one or more characters;

means for detecting one or more repetitions of the last input character;

means for executing further steps after the initiating step in the input method editor loop in response to the repetitions of the last input character; and means for modifying the word in the input text based upon a modification of the word contained in the input method editor loop.

22. An apparatus as claimed in claim 21, the input method editor loop containing a hierarchy of modifications of the word in a predetermined hierarchy.

23. An apparatus as claimed in claim 22, the modifying means providing successive modifications of the word upon successive apostrophes detected by the detecting means.

24. An apparatus as claimed in claim 23, wherein the successive modifications provided by the modifying means are implemented according to a hierarchy of modifications of the word in the input method editor loop.

25. An apparatus as claimed in claim 21, wherein the input method editor loop includes a hierarchy of modifications of the word in an order determined by Italian language rules.

26. An apparatus as claimed in claim 21, wherein the input method editor loop includes a hierarchy of modifications of the word in an order determined by Italian language rules and frequency of modifications of the word selected by a user.

27. An apparatus as claimed in claim 21, further comprising means for displaying available modifications of the word contained in the input method editor loop.

28. An apparatus as claimed in claim 21, the modifying means modifying the word to provide an optimally-accented form of the word without requiring a user to select an accented form of the word.

* * * * *